United States Patent
Thornburg et al.

(10) Patent No.: US 12,521,784 B2
(45) Date of Patent: Jan. 13, 2026

(54) SYSTEMS, DEVICES, AND METHODS FOR SPACECRAFT PROPULSION WITH A HEAT EXCHANGER

(71) Applicant: Portal Space Systems Inc., Bothell, WA (US)

(72) Inventors: Jeffery T. Thornburg, Bothell, WA (US); Prashaanth Ravindran, Everett, WA (US)

(73) Assignee: Portal Space Systems Inc., Bothell, WA (US)

( * ) Notice: Subject to any disclaimer, the term of this patent is extended or adjusted under 35 U.S.C. 154(b) by 0 days.

(21) Appl. No.: 18/354,312

(22) Filed: Jul. 18, 2023

(65) Prior Publication Data
US 2025/0025931 A1    Jan. 23, 2025

(51) Int. Cl.
| | |
|---|---|
| *B21D 53/02* | (2006.01) |
| *B33Y 10/00* | (2015.01) |
| *F03H 99/00* | (2009.01) |
| *F28D 21/00* | (2006.01) |
| *B33Y 80/00* | (2015.01) |
| *B64G 1/40* | (2006.01) |

(52) U.S. Cl.
CPC .............. *B21D 53/02* (2013.01); *B33Y 10/00* (2014.12); *B33Y 80/00* (2014.12); *B64G 1/415* (2023.08); *F03H 99/00* (2013.01); *F28D 2021/0021* (2013.01)

(58) Field of Classification Search
CPC ........... B64G 1/415; B64G 1/401; F02K 9/42; F03H 99/00
See application file for complete search history.

(56) References Cited

U.S. PATENT DOCUMENTS

| | | | | |
|---|---|---|---|---|
| 2,975,592 | A * | 3/1961 | Fox | F02K 9/64 60/257 |
| 3,064,418 | A * | 11/1962 | Sanders | F24S 10/80 376/318 |
| 3,280,568 | A * | 10/1966 | Burnam | G21H 3/00 376/318 |
| 4,548,033 | A * | 10/1985 | Cann | F03H 1/0068 315/111.61 |
| 4,730,449 | A * | 3/1988 | Cann | F02K 9/68 976/DIG. 317 |
| 4,815,443 | A * | 3/1989 | Vrolyk | F24S 23/81 126/696 |

(Continued)

FOREIGN PATENT DOCUMENTS

| | | | | |
|---|---|---|---|---|
| DE | 10311010 A1 * | 9/2004 | | F02K 9/42 |
| WO | WO-2022076084 A2 | 4/2022 | | |

OTHER PUBLICATIONS

DE-10311010-A1 machine translation (Year: 2004).*

*Primary Examiner* — Michael W Hotchkiss
(74) *Attorney, Agent, or Firm* — COOLEY LLP

(57) ABSTRACT

The present disclosure relates to systems, devices, and methods for spacecraft propulsion. In an embodiment, the present disclosure relates to an apparatus comprising a heat exchanger body defining a plurality of propellant channels configured to contain a propellant, a central cavity configured to contain a working fluid and fluidically connected to a plurality of working fluid channels that extend along a radial dimension of the apparatus, and a nozzle fluidically connected to the plurality of propellant channels and configured to expel the propellant.

16 Claims, 7 Drawing Sheets

(56) References Cited

U.S. PATENT DOCUMENTS

| | | | | |
|---|---|---|---|---|
| 5,138,832 | A * | 8/1992 | Pande | B64G 1/401 |
| | | | | 165/907 |
| 5,519,991 | A * | 5/1996 | Butler | B64G 1/415 |
| | | | | 313/46 |
| 7,743,601 | B2 * | 6/2010 | Calabro | B64G 1/402 |
| | | | | 60/200.1 |
| 10,358,958 | B2 * | 7/2019 | Lorenz | F28D 7/0075 |
| 11,077,964 | B1 * | 8/2021 | Grubisic | B64G 1/415 |
| 11,346,306 | B1 | 5/2022 | Wu et al. | |
| 11,391,246 | B2 * | 7/2022 | Sercel | B64G 1/446 |
| 2008/0134663 | A1 * | 6/2008 | Totani | B64G 1/415 |
| | | | | 60/203.1 |
| 2008/0156316 | A1 * | 7/2008 | Yangpichit | F28D 20/0034 |
| | | | | 126/698 |
| 2009/0218086 | A1 * | 9/2009 | Sciorelli | F02K 9/974 |
| | | | | 165/181 |
| 2011/0114285 | A1 * | 5/2011 | Buxbaum | C22C 9/00 |
| | | | | 164/76.1 |
| 2014/0076293 | A1 * | 3/2014 | Gaiser | F28D 7/0066 |
| | | | | 165/100 |
| 2016/0129417 | A1 * | 5/2016 | Aimone | B01J 19/2415 |
| | | | | 422/240 |
| 2018/0127854 | A1 * | 5/2018 | Aimone | C22C 1/02 |
| 2018/0236552 | A1 * | 8/2018 | Basini | B33Y 30/00 |
| 2018/0298846 | A1 * | 10/2018 | Anflo | F02K 9/42 |
| 2019/0120562 | A1 * | 4/2019 | Fuller | F28F 13/08 |
| 2019/0219337 | A1 * | 7/2019 | Twelves | F28D 7/1623 |
| 2020/0003497 | A1 * | 1/2020 | Aston | B22F 12/38 |
| 2023/0194179 | A1 * | 6/2023 | Capodagli | F28D 7/02 |
| | | | | 165/173 |

* cited by examiner

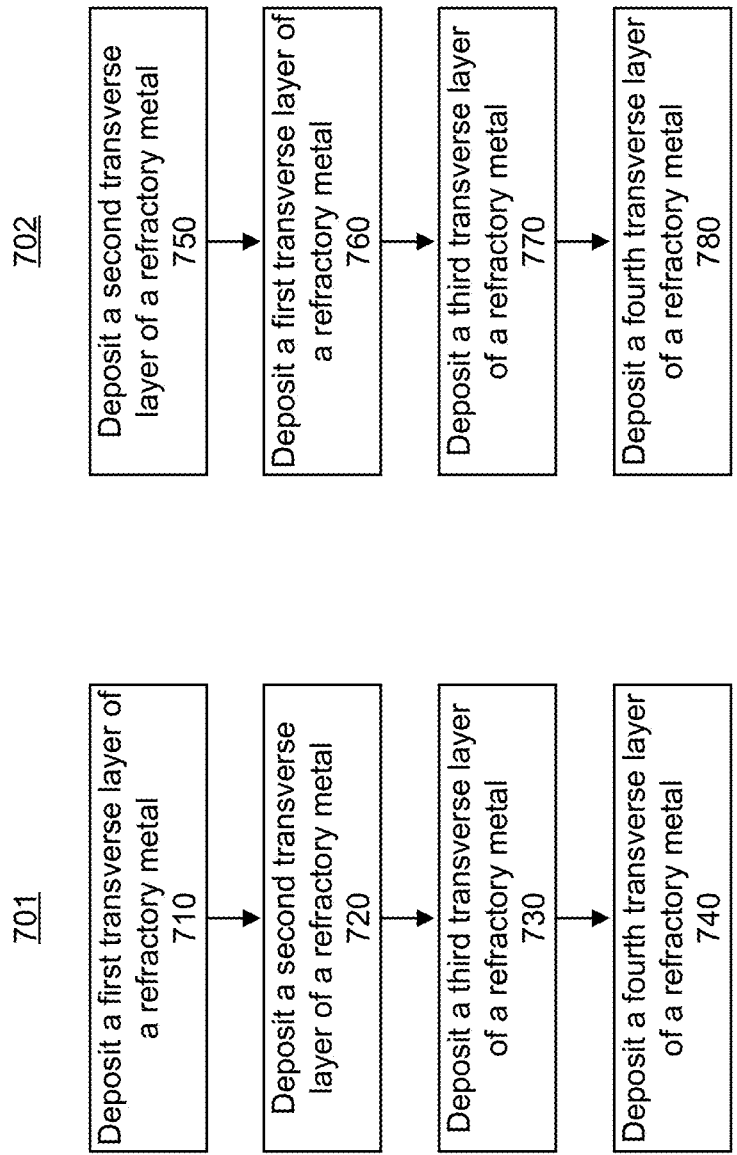

SYSTEMS, DEVICES, AND METHODS FOR SPACECRAFT PROPULSION WITH A HEAT EXCHANGER

TECHNICAL FIELD

The present disclosure relates to systems, devices, and methods for spacecraft propulsion, for example, an additively manufactured heat exchanger that can transfer heat from a hot working fluid to a propellant. The heated propellant can be expelled through a nozzle, producing thrust. In some embodiments, the propellant may not be combusted or otherwise reacted, such that the heat exchanger and the nozzle form a portion of a non-combustive rocket engine.

BACKGROUND

Spacecraft, which may include satellites and space vehicles, may utilize on-board propulsion systems to maneuver in a space environment. Some spacecraft may employ on-board propulsion systems to perform post-launch orbit-raising maneuvers, attitude control, station-keeping, and/or deorbit maneuvers. The capabilities of the on-board propulsion system(s) may limit the maneuvers that may be performed by the spacecraft. Known practical propulsion systems include (i) combustion-based propulsion systems (e.g., mono-propellant and bi-propellant propulsion systems), which are generally suitable to produce relatively high thrust; (ii) cold gas thrusters, which are generally relatively light weight; and (iii) electric propulsion systems, which generally have relatively high specific impulse. Each of these propulsion technologies, however, also carries significant drawbacks. For example, combustion-based propulsion systems may be inefficient (e.g., low specific impulse) and may require significant propellant mass at launch, which may decrease the mass of any potential payload carried by the spacecraft. Some combustion-based propellant systems may also use multiple hypergolic propellants (e.g., monomethyl hydrazine and nitrogen tetroxide) to increase efficiency and/or thrust, which may result in separate fluid systems that add significant dry mass and operational complexities. Cold gas and related propulsion systems may generate low levels of thrust, which may be insufficient for orbit-raising maneuvers, deorbiting maneuvers, or any other maneuver that requires relatively high delta-v in a relatively short time period. Cold gas and related propulsion systems may also use additional heaters to maintain a propellant within operating conditions, which may use additional power provided by components such as the solar array. Electric spacecraft propulsion systems are typically capable of relatively very little thrust and may draw significant electrical power, which may involve the use of heavy and/or complex additional components such as a solar array and associated electrical equipment. Electric spacecraft propulsion systems may be suitable for in-orbit station keeping and certain deep space missions but are generally unsuitable for more significant in-orbit maneuvers. Spacecraft propulsion systems that rely on electric power may not be well suited (or may operate inefficiently) in a low-earth orbit environment due to relatively minimal sun exposure and/or greater atomic oxygen levels.

A need exists for spacecraft propulsion systems that are suitable for delivering relatively high delta-v for a relatively large number of uses and/or total duration. Accordingly, additional devices, systems, and methods for spacecraft propulsion are desirable, particularly those that may help ameliorate some of the complexities discuss above.

SUMMARY

The present disclosure relates generally to systems, devices, and methods for spacecraft propulsion with a heat exchanger. In some embodiments, the heat exchanger can transfer heat from a solar collector or other heat source to a propellant. The heated propellant can be expelled through a rocket nozzle to form at portion of a spacecraft propulsion system. In some embodiments, the heat exchanger and the nozzle form a portion of a non-combustive rocket. In some embodiments the heat exchanger body may define a plurality of propellant channels that are configured to contain a propellant. The propellant channels may extend along an axial dimension of the heat exchanger body. The heat exchanger body may also define a central cavity that is configured to contain a working fluid. The central cavity may extend along an axial dimension of the heat exchanger body. The central cavity may be fluidically connected to a plurality of working fluid channels that each extend along a radial dimension of the heat exchanger body. The apparatus may also comprise a nozzle that is fluidically connected to the plurality of propellant channels. The nozzle may be configured to expel the propellant. In some variations, the heat exchanger body may be configured to transfer heat from the working fluid to propellant in the propellant channels. In some variations, the heat exchanger body may be configured to recirculate the working fluid through the working fluid channels.

The apparatus may comprise a heat exchanger body and a nozzle. The heat exchanger body may define a plurality of propellant feed channels and a plurality of working fluid channels. The heat exchanger body may be configured to transfer heat from working fluid recirculating through the working fluid channels to the propellant. The nozzle may be fluidically connected to the plurality of propellant feed channels and may be configured to expel the propellant after being heated by the working fluid via the heat exchanger body to produce thrust without the propellant being combusted. The propellant may be ammonia and the working fluid may be a molten salt. The heat exchanger body, the plurality of propellant feed channels, and the plurality of working fluid channels are collectively configured to heat the propellant to a temperature greater than about 1000 degrees C. In some variations, a propellant tank may be fluidically coupled to the heat exchanger body. The propellant tank may be configured to introduce the propellant into the propellant feed channels of the heat exchanger body. The propellant tank may be toroidal, coaxial with, and exterior to the heat exchanger body. The propellant tank may be configured to contain the propellant at a temperature below about −23 degrees C. The apparatus may further comprise a reservoir configured to store the working fluid. The reservoir may be fluidically coupled to an inlet and an outlet of the plurality of working fluid channels such that working fluid can collect in the reservoir to be recirculated through the plurality of working fluid channels. In some variations, a solar collector may be configured to capture solar energy and heat the working fluid before it enters or after it exits the heat exchanger. In some variations, at least one of a nuclear reactor or a radioisotope thermal generator may be configured to heat the reservoir.

Methods of manufacturing a heat exchanger are also described herein. The heat exchanger may be constructed via an additive manufacturing process. The additive manufacturing process may comprise depositing a first transverse layer of a refractory metal that partially defines a central cavity. The refractory metal may be a niobium alloy. In some variations, the refractory metal may be a copper alloy. The central cavity may be configured to contain a working fluid. The first transverse layer may also partially define a portion of a radial channel coupled to the central cavity. The radial channel may be configured to route the working fluid from the central cavity to an outlet port on an exterior radial surface of the heat exchanger. The additive manufacturing process may further comprise depositing a second transverse layer of the refractory metal above the first transverse layer in an axial direction. The second transverse layer may define a portion of a propellant feed channel that is configured to convey a propellant axially through the heat exchanger such that heat is transferred from the working fluid to the propellant via the refractory metal.

In some variations, the additive manufacturing process may further comprise depositing a third transverse layer of the refractory metal above the second transverse layer in the axial dimension. The third transverse layer may define an outlet to the propellant feed channel. The additive manufacturing process may further comprise depositing a fourth transverse layer of the refractory metal above the third transverse layer in the axial dimension. The fourth transverse layer may define a portion of a plenum coupled to the outlet of the propellant feed channel. In some variations, the third transverse layer may define a portion of a plenum coupled to the outlet of the propellant feed channel. In some variations, the fourth transverse layer may define a portion of a nozzle configured to expel the propellant. The nozzle may be coupled to the plenum.

The radial channel may be from a plurality of radial channels. Each of the plurality of radial channels may be coupled to the central cavity and configured to route the working fluid form the central cavity to an outlet port from a plurality of outlet ports. In some variations, the propellant feed channel may be from a plurality of propellant feed channels partially defined by the second transverse layer. Each propellant feed channel may be configured to convey the propellant axially through the heat exchanger to a nozzle such that propellant, after being heated by the working fluid via the refractory metal, is expelled through the nozzle to produce thrust. In some variations, thrust is produced without the propellant being combusted.

Additional embodiments, features, and advantages of the invention will be apparent from the following detailed description and through practice of the invention.

BRIEF DESCRIPTION OF THE DRAWINGS

FIG. 7A is a flowchart of an illustrative variation of manufacturing a heat exchanger of a spacecraft propulsion system. FIG. 7B is a flowchart of an illustrative variation of manufacturing a heat exchanger of a spacecraft propulsion system.

DETAILED DESCRIPTION

Devices, systems, and methods for spacecraft propulsion via a spacecraft propulsion system with a heat exchanger are described herein. The spacecraft propulsion system may be used to generate a thrust capable of maneuvering a spacecraft through a space environment. The spacecraft propulsion system may use a wide variety of propellants to perform a non-combustive thruster firing of one or more thrusters fluidically connected to, or defined by, a heat exchanger (such as the heat exchanger described herein). The spacecraft propulsion system described herein may be configured to significantly increase a temperature of a propellant, without combusting the propellant, such that thrust is efficiently generated upon expelling the propellant through a nozzle.

Figure 1:
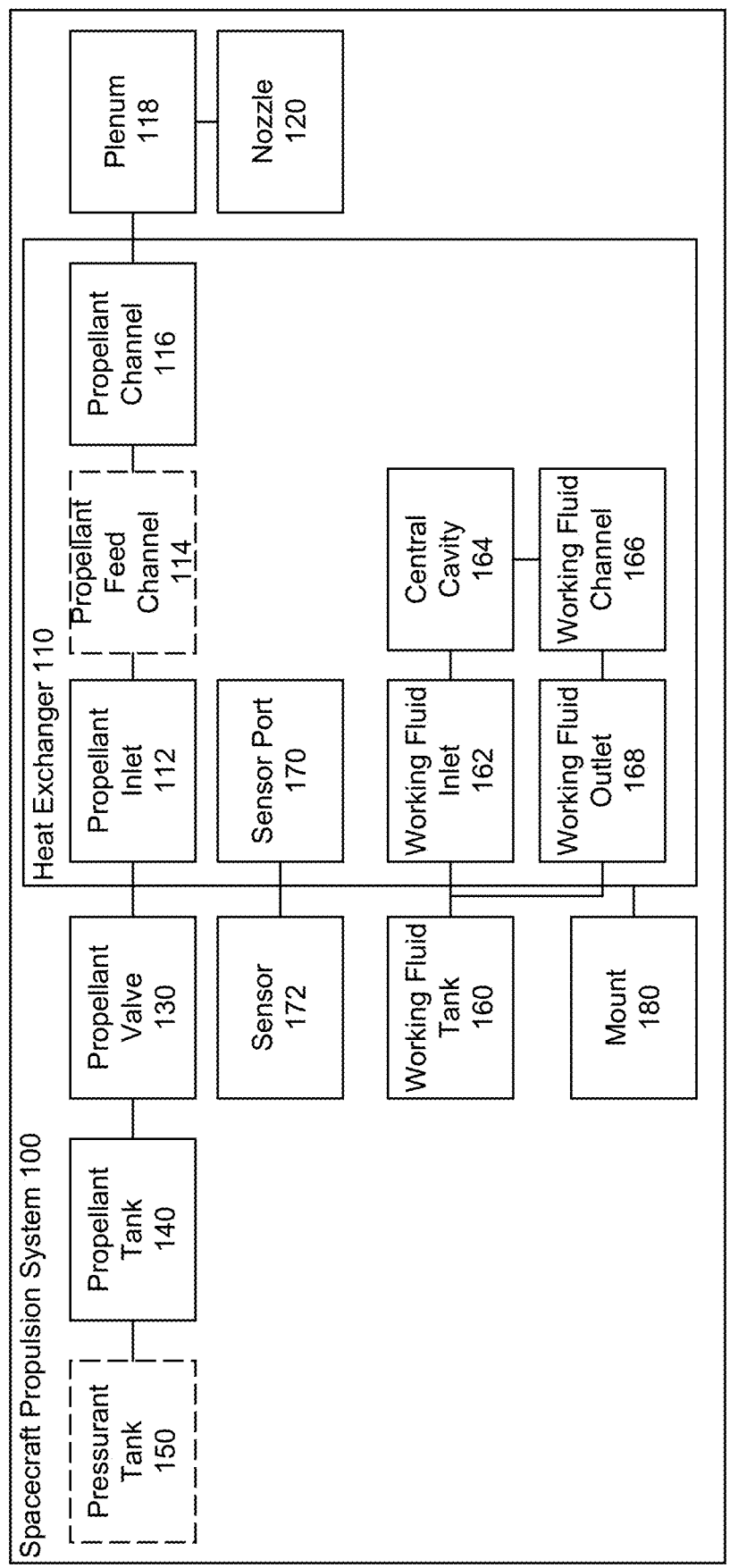
FIG. 1 is a block diagram of a spacecraft propulsion system, according to an embodiment.

FIG. 1 is a block diagram of a spacecraft propulsion system, according to an embodiment. The spacecraft propulsion system 110 may include one or more of a heat exchanger 110, a propellant valve 130, a propellant tank 140, and a pressurant tank 150. The propellant tank 140 may be configured to contain a propellant. It may be desirable for the propellant to have a relatively high specific heat, be relatively dense in the liquid phase, be relatively safe (i.e., inert) and easy to handle, be affordable, be stable (i.e., storable without degrading, evaporating, or combusting) for relatively long periods of times (e.g., about 5 years or longer) and/or non-corrosive. Materials commonly used as refrigerants may be particularly well suited as propellants for embodiments described herein. In particular, the present disclosure generally describes ammonia as the propellant, but those skilled in the art would readily understand that many other propellants, such as xenon, nitrogen, argon, helium, hydrazine, methane, mercury, and many other substances may be suitable for the propulsion systems described herein. Typically, the propellant would be stored in the propellant tank 140 as a liquid, although compressed gas or solid propellants are also possible.

The propellant tank 140 may be configured to contain a propellant and control the flow thereof. The propellant may be expelled by the spacecraft propulsion system such that a thrust is generated that is sufficient to move a spacecraft in a space environment. Accordingly, the propellant tank 140 may contain a mass of propellant corresponding to a preplanned quantity and/or duration of in-space maneuvers. In an exemplary variation, the propellant tank 140 may be configured to contain an initial propellant load of 400 kg. In further variations, the propellant tank 140 may be configured to contain an initial propellant load of about 100 kg, about 200 kg, about 300 kg, about 500 kg, or greater. The mass of propellant may advantageously be less than a combustion-based propulsion system that uses a fuel and, optionally, an oxidizer, which may generate thrust less efficiently and thus require a greater initial propellant load than the non-combustive propulsion system described herein. The mass of propellant may also be less than an electric propulsion system, which may generate significantly less thrust and thus, similar to the combustion-based system, require a greater initial propellant load than the non-combustive propulsion system described herein.

The propellant tank 140 can be any suitable size and shape, such as a sphere or cylinder. In some embodiments, however, it may be desirable for the propellant tank 140 to be toroidal with the heat exchanger 110 positioned in the annulus of the propellant tank. In a variation, the propellant tank 140 may be coaxial with, and exterior to, a body of the heat exchanger 110. In this way, the propellant tank can be fluidically coupled to the heat exchanger 110 at multiple radial positions, with minimal plumbing. The dimensions of the propellant tank 140 may be at least partially determined by a pressure and/or a temperature of a propellant contained therein. For example, the maximum expected operating pressure (MEOP) of the propellant may determine the size, shape, length, diameter, and/or thickness of the propellant tank 140. In some variations, a relatively high propellant tank MEOP value may correspond to a relatively thick sidewall to prevent sidewall ruptures. In another variation, a relatively high propellant tank MEOP value may correspond to a spherical shape, which may prevent stress concentrations which could rupture near or at the propellant tank's MEOP. In an exemplary variation, the propellant tank may store a propellant at an initial propellant pressure of about 30 psi. In some variations, the propellant tank may store a propellant at about 20 psi, about 40 psi, about 50 psi, about 60 psi, about 70 psi, about 80 psi, about 90 psi, about 100 psi, or greater. The MEOP may correspond to a margin of safety relative to the initial pressure, such as a multiple of about 1.25, about 1.5, about 1.75, about 2, or about 2.5 of the initial pressure. The propellant tank pressure may increase or decrease as propellant contained therein is depleted. In an exemplary variation, the propellant tank may store a propellant at an initial propellant temperature below about −23 degrees C. The initial propellant temperature may be determined by a target pressure, a target density, a target viscosity, or combination thereof. In some variations, the propellant may be stored at an initial propellent temperature of about −60 degrees C., about −55 degrees C., about −50 degrees C., about −45 degrees C., about −40 degrees C., about −30 degrees C., about −20 degrees C., about −10 degrees C., about 0 degrees C., about 10 degrees C., or greater. The propellant tank 140 may further comprise a rib feature (i.e., a propellant management device) configured to control propellant contained within the propellant tank 140. For example, the rib feature may reduce sloshing of the propellant before, during, or after an orbital maneuver performed by the spacecraft. The rib feature may comprise a protrusion from an internal surface of the propellant tank. The rib feature may comprise a plurality of rib features, each protruding from the internal surface and spaced equidistantly around the propellant tank 140.

The propellant tank 140 may be fluidically connected to one or more components of the spacecraft propulsion system. In an embodiment, the propellant tank 140 may be fluidically connected to the heat exchanger 110 via tubing made of stainless steel, aluminum, or any other suitable material. Similarly stated, tubing can connect a propellant outlet of the propellant tank to a propellant inlet of the heat exchanger 110. In some embodiments, one or more propellant valve 130 (s) between the propellant tank 140 and the heat exchanger 110 can be operable to connect/disconnect the heat exchanger 110 from the propellant tank 140 and/or control the flow rate and/or pressure of propellent entering the heat exchanger 110. For example, the propellant valve 130 can be a pressure regulator, latch valve, or any other suitable valve. The propellant valve 130 (s) can be opened, closed, modulated, and/or otherwise controlled (i.e., set a position thereof) via an electrical signal sent by an electrical system of a spacecraft. In an exemplary variation, at least partially opening the propellant valve 130 may correspond to a thruster firing. In this way, the thruster firing via the propulsion system described herein may be throttleable (that is, a thrust force may be less than the maximum thrust associated with a fully open propellant valve). The throttled performance may be about 10%, about 20%, about 30%, about 40%, about 50%, about 60%, about 70%, about 80%, or about 90% of the maximum achievable thrust. The spacecraft may receive a command from a user (e.g., ground control personnel) to open or close the propellant valve 130. In some variations, the spacecraft may autonomously (e.g., without receiving a command from a user) open, close, modulate, and/or otherwise control the propellant valve 130 (s) in response to an on-board event. For example, the propellant valve 130 may autonomously switch from a closed position to an open position if the propellant tank 140 exceeds a predetermined propellant pressure threshold. In another example, the propellant valve 130 may autonomously switch from an open position to a closed position if a propellant leak from the heat exchanger is detected. A leak may be determined by a pressure measurement within the spacecraft propulsion system unexpectedly changing over a relatively short period of time. In another exemplary variation, the propellant temperature may be increased while the propellant is retained within the propellant tank 140.

The conditions of the propellant tank 140 may be measured and/or controlled by one or more components. In some embodiments, one or more of a pressure sensor and a temperature sensor can be configured to measure the contents of the propellant tank 140. The pressure sensor may be configured to measure a pressure value within the propellant tank 140. The pressure sensor may be coupled to an internal surface of the propellant tank 140. The temperature sensor may be configured to measure a temperature value within (e.g., a propellant temperature), or external to (e.g., a spacecraft temperature), the propellant tank 140. The temperature sensor may be coupled to an external surface or an internal surface of the propellant tank 140. In some variations, there may be one or more thermal blankets wrapped around a portion of the propellant tank 140. The thermal blanket (e.g., a multi-layer insulation blanket) may be configured to thermally insulate the propellant tank and/or the propellant contained therein. In some variations, there may be at least one heater coupled to the propellant tank 140. The heater may comprise a resistive circuit configured to raise the bulk fluid temperature of a propellant within the propellant tank 140. The propellant tank and/or propellant contained therein may be heated via radiative heat transferred by the heat exchanger 110, which may reduce the need for additional heaters coupled to the propellant tank. In this way, the propellant temperature may be increased to a pre-firing temperature from the initial propellant temperature prior to flowing from the propellant tank 140 to the heat exchanger 110. In some variations, the pre-firing propellant temperature may be about the same temperature as a long-term storage temperature. In other variations, the pre-firing propellant temperature may be higher than the long-term storage temperature by about 5 degrees C., about 10 degrees C., about 15 degrees C., about 20 degrees C., or greater. The propellant temperature may be increased before or during a thruster firing to minimize thermal shock of the heat exchanger upon initial contact between the propellant and heat exchanger.

A pressurant tank may be fluidically connected to one or more system components. In an exemplary variation, the pressurant tank 150 can be fluidically coupled to a pressurant inlet of the propellant tank 140 via any suitable plumbing compatible with the pressurant and the space environment, for example, stainless steel or aluminum tubing. The pressurant tank can be configured to contain a pressurant, such as helium or nitrogen, typically at a higher pressure than the propellant is stored at in the propellant tank 140. For example, the pressurant tank may store a pressurant at an initial pressure of 50 psi. In some variations, the pressurant tank may store a pressurant at about 30 psi, about 40 psi, about 60 psi, about 70 psi, about 80 psi, about 90 psi, about 100 psi, about 120 psi, about 150 psi, about 200 psi, about 250 psi, or greater. The pressurant tank 150 may release a volume of pressurant through tubing to the propellant tank 140 before, during, or after a thruster firing. In this way, the pressurant tank 150 may increase a pressure of the propellant tank 140 as propellant is expelled from the system. The pressurant pressure may decrease as pressurant is released. The pressurant may be in a liquid state, a gaseous state, or combination thereof.

The tubing that may connect the pressurant tank to the propellant tank may comprise one or more components configured to control flow of a pressurant therebetween. In an exemplary variation, the tubing can connect a pressurant outlet of the pressurant tank 150 to a pressurant inlet of the propellant tank 140, via a pressurant valve (not shown) between the pressurant tank and propellant tank. For example, the pressurant valve can be a pressure regulator, latch valve, or any other suitable valve. The pressurant valve can be opened, closed, modulated, and/or otherwise controlled or set via an electrical signal sent by an electrical system of a spacecraft. For example, the spacecraft may receive a commands from a user (e.g., ground control personnel) to open or close the pressurant valve. In some variations, the spacecraft may autonomously (e.g., without receiving a command from a user) open, close, modulate, and/or otherwise control/set the pressurant valve in response to an on-board event. For example, the pressurant valve may autonomously switch from a closed position to an open position if the pressurant tank 150 exceeds a predetermined pressurant pressure threshold. In another example, the pressurant valve may autonomously switch from an open position to a closed position if a pressurant or a propellant leak from the heat exchanger is detected. A leak may be determined by a pressure measurement within the spacecraft propulsion system unexpectedly changing over a relatively short period of time.

The pressurant may be configured to optimize performance of the spacecraft propulsion system described herein. For example, the pressurant can be operable to increase pressure within the propellant tank 140, which may increase a flow rate of propellant from the propellant tank 140 into the heat exchanger 110 and/or increase a thrust force generated by the propellant expelled from the heat exchanger 110. In some variations, the pressurant can be configured to partially or completely mix with the propellant. The resulting mixture may be homogenous or heterogeneous. In some variations, the pressurant may be separated from the propellant by a rubber diaphragm coupled to an inner surface of the propellant tank 140. The rubber diaphragm may be substantially impermeable to the pressurant. In this way, the propellant within the spacecraft propulsion system 110 may be maintained at a target propellant pressure. The shape of the pressurant tank 150 may be at least partially determined by the propellant contained therein. For example, the maximum expected operating pressure (MEOP) of the pressurant may determine the size, shape, and/or sidewall thickness of the pressurant tank 150. In some variations, a relatively high pressurant tank MEOP value may correspond to a relatively thick sidewall to prevent sidewall ruptures. In another variation, a relatively high pressurant tank MEOP value may correspond to a spherical shape, which may prevent stress concentrations which could rupture near or at the pressurant tank's MEOP. The MEOP may correspond to a margin of safety relative to the initial pressure, such as a multiple of about 1.25, about 1.5, about 1.75, about 2, or about 2.5 of the initial pressure.

The conditions of the pressurant tank may be measured and/or controlled by one or more components. In some embodiments, one or more of a pressure sensor and a temperature sensor can be configured to measure a fluid parameter (e.g., pressure and temperature) associated with the pressurant tank 150. For example, the pressure sensor may be coupled to an internal surface of the pressurant tank 150 such that a pressure value within the tank may be measured. In another example, the temperature sensor may be configured to measure a temperature value within the pressurant tank 150. The temperature sensor may be coupled to an external surface or an internal surface of the pressurant tank 150. In some variations, there may be one or more thermal blankets wrapped around a portion of the pressurant tank 150. The thermal blanket (e.g., multi-layer insulation blanket) may be configured to thermally insulate the pressurant tank and/or the pressurant contained therein. In some variations, there may be at least one heater coupled to the pressurant tank 150. The heater may comprise a resistive circuit configured to raise the bulk fluid temperature of a pressurant within the pressurant tank 150.

The spacecraft propulsion system may include one or more components configured to receive, store, and/or generate heat. In an exemplary variation, the spacecraft propulsion system 110 may include a working fluid tank 160 (also referred to as a reservoir or working fluid reservoir). In some variations, the spacecraft propulsion system 110 may comprise a plurality of working fluid tanks. The working fluid tank 160 may be configured to store a working fluid configured to efficiently store and/or transfer heat. The working fluid may be a liquid, a solid, a gas, or combination thereof. In some variations, the spacecraft propulsion system may comprise a plurality of working fluid tanks. Each of the plurality of working fluid tanks may be fluidically connected to each other via a valve, tubing, and/or a heat exchanger. The working fluid tank 160 may be configured to receive heat such that a temperature of the working fluid contained therein is increased. For example, a temperature of the working fluid tank 160 and/or working fluid contained therein may be increased via one or more of a nuclear reactor, a radioisotope thermal generator, a solar collector (e.g., a solar concentrating mirror), a combustion source, and a heater. In an exemplary variation, a solar concentrating mirror may comprise a parabolic or elliptical mirror configured to focus, concentrate, and/or redirect solar energy to one or more locations on an external surface of the working fluid tank 160. The concentrated solar energy may be directed through a diffusing element configured to partially diffuse the solar energy, which may advantageously prevent the solar energy from forming a local hot spot that may otherwise degrade a surface (e.g., burn a hole therethrough) of the working fluid tank. In another variation, a focal length associated with a solar concentrating mirror may be adjusted to reduce or increase the amount of solar energy redirected to the working fluid tank. In a further variation, the solar collector may comprise fiber optic cables configured to receive solar energy from a solar concentrating mirror. The fiber optic cables may be connected to the working fluid tank 160 such that solar energy collected by the solar collector is transferred to the working fluid tank 160 to increase a temperature thereof and/or a temperature of a working fluid contained therein. In another variation, the working fluid temperature may be increased as the working fluid flows through one or more of the nuclear fission reactor, the radioisotope thermal generator (RTG), and the solar collector.

The working fluid tank 160 can be constructed of a material configured to withstand and/or transfer relatively high heat, such as a material with a high heat transfer coefficient. The high heat transfer coefficient may facilitate efficient heat transfer from the working fluid tank 160 to the working fluid upon contact therewith. The working fluid tank 160 can be a material suitable to contain the working fluid without degradation. For example, the working fluid tank 160 may be manufactured from aluminum, stainless steel, copper, or a niobium alloy. The working fluid tank 160 may comprise any suitable shape, such as a sphere, cylinder, toroid, or combinations thereof. The working fluid tank 160 may be fluidically connected to the heat exchanger 110 via tubing. The tubing may comprise the same or different material as the working fluid tank 160. In some variations, there may be one or more thermal blankets wrapped around a portion of the working fluid tank 160. The thermal blanket (e.g., multi-layer insulation blanket) may be configured to thermally insulate the working fluid tank and/or the working fluid contained therein. In this way, the working fluid tank 160 may be configured to reduce radiative heat transfer outwards to other system components and/or a space environment.

The working fluid can be a material with a high heat transfer coefficient. The high heat transfer coefficient may facilitate efficient heat transfer (e.g., a high heat flux value) from the working fluid to the propellant via heat exchanger 110. The heat transfer to or from the molten salt may be via convection, radiation, and/or conduction. In some variations, the working fluid can be a molten salt. The working fluid may have a viscosity of between about 0.001 Pa-see and about 0.05 Pa-sec. The working fluid viscosity may facilitate a flow rate such that the working fluid and the heat exchanger are in contact for a time sufficient to transfer heat therebetween. The working fluid viscosity may also avoid stagnation of the working fluid in a given location within the heat exchanger, which may lead to a local hotspot and a significant increase in degradation of the heat exchanger. In an exemplary variation, a target flow rate of the working fluid through the heat exchanger may be between about 0.01 m/s and 1 m/s, or any value therebetween. A predetermine volume of working fluid may flow from the working fluid tank 160 to the heat exchanger 110 according to the target flow rate. In an exemplary variation, the predetermined volume of working volume represents about half of the total working fluid contained within spacecraft propulsion system described herein. In this way, about half of the working fluid may be pumped from the working fluid tank 160 to the heat exchanger 110 to transfer heat thereto, while the remaining portion of the working fluid is retained within the working fluid tank 160 so that it continues to receive heat from the heat generator (e.g., solar collector, nuclear fission reactor, RTG). Similarly stated, the volume of the working fluid flow paths of the heat exchanger 110 can be about 50% of the volume of the working fluid.

The spacecraft propulsion system described herein may be capable of performing an in-space maneuver autonomously or in response to a command transmitted by a user (e.g., ground control personnel). The system may be capable of performing a maneuver totaling a delta-V of 6 km/s. The total delta-V may be spread across a plurality of maneuvers or may be achieved in a single maneuver. A maneuver may comprise continuous or discontinuous firing of the spacecraft propulsion system. In other variations, the total delta-V may be about 1 km/s, about 2 km/s, about 3 km/s, about 4 km/s, or about 5 km/s. The total delta-V may depend on the overall mass of the spacecraft propulsion system, including the mass of any components, propellant, pressurant, and/or working fluid contained therein. In an exemplary variation, the spacecraft propulsion system mass may be about 500 kg. In some variations, the spacecraft propulsion system mass may be about 100 kg, about 200 kg, about 300 kg, about 400 kg, about 450 kg, about 550 kg, about 600 kg, about 700 kg, about 800 kg, about 900 kg, or about 1000 kg. In some variations, the total delta-V may depend on a propellant throughput capability (i.e., total mass of propellant the system may process prior to irreparable or otherwise unacceptable degradation in either the system components or thrust force profile).

In an exemplary variation, the spacecraft propulsion system can be operable to produce about 200 Newtons (N) of thrust by expelling the propellant from a nozzle coupled to, or defined by, the heat exchanger described herein. In other variations, the spacecraft propulsion system can produce about 50 N, about 100 N, about 150 N, about 175 N, about 250 N, about 300 N, or greater. The amount of thrust may be a function of one or more of a propellant temperature, propellant pressure, propellant flow rate, pressurant pressure, a chemical composition of the propellant, a fluid state of the propellant, pressurant temperature, pressurant pressure, heat exchanger temperature, and space environment conditions. For example, it may be advantageous to increase the temperature of the propellant to increase the amount of thrust generated by expelling the propellant via the nozzle. In another example, the amount of thrust generated by expelling the propellant may be directly proportional to the propellant pressure.

The amount of thrust relative to the volume of propellant expelled may be used to determine an efficiency parameter (e.g., specific impulse). In an exemplary variation, the efficiency parameter can be about 400 seconds. In other variations, the efficiency parameter can be about 250 seconds, about 300 seconds, about 350 seconds, about 450 seconds, or greater. The specific impulse value may advantageously be greater than a combustion-based or cold gas propulsion system, which may result in a lower mass of propellant required to perform pre-planned orbital maneuvers (e.g., orbit-raising, station-keeping, de-orbiting). The efficiency parameter may be at least partially associated with the density of the propellant before or during use. For example, a propellant comprising ammonia may be stored at a first density value of about 700 kg/m3 (which may correspond to a propellant pressure of about 30 psi and a propellant temperature of about −50 degrees C.). The propellant may flow through the heat exchanger, vaporize and/or be heated and expand such that it reaches a lower second density value. The first and/or second density value may be directly proportional to a temperature value and/or a pressure value of the propellant. In an exemplary variation, the propellant may be heated to a target temperature of about 2300 degrees C. prior to expelling the propellant from the nozzle. The target temperature may correspond to a target specific impulse value, such as about 400 seconds. The propellant may be heated to any suitable temperature, such as about 1000 degrees C., about 1100 degrees C., about 1200 degrees C., about 1300 degrees C., about 1400 degrees C., about 1500 degrees C., about 1600 degrees C., about 1700 degrees C., about 1800 degrees C., about 1900 degrees C., about 2000 degrees C., about 2100 degrees C., about 2200 degrees C., or greater.

The spacecraft propulsion system may be configured to operate in any suitable orbit and may perform orbit-raising, deorbiting, and/or station-keeping maneuvers. In an exemplary variation, the spacecraft propulsion system may operate to transfer a spacecraft from a Medium Earth Orbit (MEO) to a Low Earth Orbit (LEO), or vice versa. In further variations, the spacecraft propulsion system may operate in a Geostationary Earth Orbit (GEO) or any suitable transfer orbit. The spacecraft propulsions system may be configured to withstand a space environment for a predetermined period of time. In an exemplary variation, the predetermined period of time may be about 5 years. In other variations, the predetermined period of time may be about 1 year, about 2 years, about 3 years, about 4 years, about 6 years, or greater. Each component of the spacecraft propulsion system may be configured to perform effectively for the entire duration of the predetermined period of time.

A. Heat Exchanger

The heat exchanger described herein may be configured to transfer heat from a heat source to a propellant, such that the propellant may be efficiently expelled via a nozzle of the spacecraft propulsion system to generate a thrust. There may be a plurality of heat exchangers within the spacecraft propulsion system, which may or may not fluidically connected to each other. In this way, the spacecraft propulsion system may generate thrust in a multiple directions, which may allow the spacecraft to maneuver in any direction in a space environment.

Referring again to FIG. 1, the heat exchanger 110 may be configured to receive propellant from the propellant tank 140. The heat exchanger 110 may also be configured to receive working fluid from the working fluid tank 160. The heat exchanger 110 may comprise a heat exchanger body having separate fluid channels for each of the propellant and working fluid such that the fluids do not directly contact each other. The heat exchanger 110 may be configured to receive heat from a heat source and transfer heat to the propellant. For example, heat may be received by the heat exchanger 110 from a molten salt, a nuclear reactor, a radioisotope thermal generator, a solar collector, and/or a combustion source. The heat exchanger 110 can have a mass and a heat capacity associated with high heat transfer, such that the heat exchanger 110 can efficiently increase the propellant's temperature during a period of time in which the propellant is flowing therethrough. In an exemplary variation, the heat exchanger 110 can have a mass of about 30 kg. In other variations, the heat exchanger 110 can have a mass of about 10 kg, about 20 kg, about 40 kg, about 50 kg, about 60 kg, or greater. The heat exchanger may subsequently transfer heat to any component of the spacecraft and/or spacecraft propulsion system, including but not limited to a propellant. For example, the heat exchanger 110 may be configured to increase a temperature of a propellant while the propellant is flowing through the heat exchanger 110 such that the propellant may be expelled to generate thrust in an event that may be referred to as a thruster firing (even though no actual combustion may take place). In another example, the heat exchanger 110 and/or the working fluid may transfer heat to a storage tank (e.g., a propellant tank) such that the storage tank may not require additional heating elements (e.g., a heater resistor) to stay within a qualified operating temperature range (e.g., above a freezing point). The additional heating elements, if present, would typically require an electrical power source, such as a solar array. In this way, the heat transferred by the working fluid and/or heat exchanger to other components and/or fluids of the spacecraft and/or spacecraft propulsion system may reduce the electrical power required by the spacecraft propulsion system. A reduction in electrical power requirements may, in turn, advantageously allow the spacecraft to operate normally even when a solar array (if present) of the spacecraft is in a shadow of, or solar energy is otherwise blocked by, the Earth and/or a moon. Accordingly, the spacecraft propulsion system containing a heat exchanger may require significantly less electrical power—and generate significantly more thrust—than an electric propulsion system comprising, for example, an ion thruster or a stationary plasma thruster.

The heat exchanger 110 may comprise a propellant inlet 112. The propellent inlet 112 may be configured to receive a fluid, such as a propellant, in a liquid state, a gaseous state, or combinations thereof. The propellant inlet 112 may be configured to fluidically connect to a propellant line (not shown) that is also connected to a propellant tank 140 and/or a propellant valve 130. The propellant inlet 112 may further comprise a seal configured to fluidically seal the fluid path with the propellant line. In some embodiments, a propellant valve 130 may be upstream of the propellant inlet 112. The propellant valve 130 may be configured to control fluid flow (e.g., flow rate) through each of the propellant line and propellant inlet 112.

The propellant inlet 112 may be fluidically connected to one or more of a propellant channel 116 and a propellant feed channel 114 defined by the heat exchanger body. In some variations, there may be a plurality of propellant channels and a plurality of propellant feed channels. In this way, the propellant tank may be fluidically coupled to and configured to introduce propellant into the propellant feed channels 114 and/or propellant channels 116 of the heat exchanger body. In some variations, one or more of the plurality of propellant channels 116 may be fluidically connected to one or more of the plurality of propellant feed channels 114. Each of the plurality of propellant channels 116 and propellant feed channels 114 may be configured to increase a contact surface area between a propellant flowing therethrough and a wall of each of the propellant channel 116 and propellant feed channel 114. The heat exchanger body, plurality of propellant feed channels, and/or plurality of propellant channels may be configured to transfer heat to a propellant flowing therethrough.

The dimensions of one or more of the propellant channels and propellant feed channels may vary. For example, the propellant feed channel 114 (if present) may comprise a first width near or at the propellant inlet 112, where the width may increase or decrease at locations further from the propellant inlet 112 along a length of the propellant feed channel 114. In this way, a cross sectional area of the propellant feed channel may vary along the fluid path defined by the propellant feed channel 114. In some instances and/or locations, the cross sectional area of the propellant feed channel 114 can decrease in the flow direction, which can decrease the pressure drop of propellant across the heat exchanger 110. In addition or alternatively, in some instances and/or locations, a cross sectional area of the propellant feed channel 114 can increase in some locations, optionally after a constriction point to form a venturi structure. Increasing the cross sectional area of the propellant feed channel 114 and/or forming a venturi structure can cause the flow rate of propellant to increase locally, which can be particularly well suited for "hot spots" in which local temperature of the heat exchanger 110 would be significantly higher than the average heat exchanger temperature in the absence of additional cooling (heat transfer to the propellant) provided by locally increased propellant flow rate. Additive manufacturing techniques, such as those described in additional detail below may be particularly well suited for fabricating propellant feed channels 114 with varying cross-sectional areas. The propellant channel 116 may be configured in a similar fashion as described for the propellant feed channel 114. In some variations, the propellant channels 116 may be present within the heat exchanger 110 without any propellant feed channels 114. Similarly stated, in some embodiments there may not be a meaningful distinction between feed channels and propellant channels.

The propellant feed channels 114 and/or propellant channels 116 described herein may extend along an axial dimension defined by the heat exchanger. In some variations, the propellant feed channels and/or propellant channels may be generally linear and may extend generally parallel to the axial dimension. In other variations, the propellant feed channel 114 and/or propellant channels 116 may extend at an angle relative to the axial dimension of the heat exchanger. For example, the propellant feed channel 114 and/or propellant channel 116 can be a spiral (e.g., helix) around an axis defined by the axial dimension of the heat exchanger. In such a variation, the length of the helical flow path defined may be greater than the linear configuration, which may increase the time propellant flows therethrough and subsequently facilitate a greater increase in propellant temperature.

The spacecraft propulsion system 100 may comprise one or more fluid reservoirs configured to contain fluid (e.g., propellant) before, during, or after heat has been transferred to the fluid. For example, one or more of the propellant channel 116 and propellant feed channel 114 may be fluidically connected to a plenum 118. The plenum 118 may be coupled to the heat exchanger body or may be defined by the heat exchanger body. In this way, the plenum 118 can be a propellant reservoir configured to contain the propellant. The plenum 118 may operate to reduce fluctuations in pressure and/or flow rate of the propellant. For example, the plenum 118 may receive propellant at a varying entry flow rate such that the propellant is combined with propellant already contained within the plenum 118, and the resulting combined propellant mass may exit the plenum at a different, more consistent exit flow rate. In some variations, the plenum 118 may comprise a fluid control feature configured to control the movement of the propellant. For example, the fluid control feature may comprise a rib feature. The rib feature may be configured to direct fluid towards a nozzle 120 in a low gravity environment (i.e., in orbit around the Earth). The rib feature may comprise a protrusion extending from a sidewall of the plenum 118. The rib feature may utilize viscous and/or surface tension forces to direct and/or control flow from the sidewall of the plenum 118 to the nozzle 120.

The plenum 118 may be fluidically connected to the nozzle 120. The nozzle 120 may be configured to expel propellant after the propellant has flown through at least a portion of the heat exchanger 110. The nozzle 120 can have a shape configured to generate a predetermined amount of thrust. In some variations, the nozzle 120 can be a bell shape with a predetermined expansion ratio. For example, the nozzle 120 may comprise a nozzle inlet with an inlet diameter, a throat portion with a throat diameter, and an exit portion with an exit diameter. The throat diameter may be used to calculate a throat cross-sectional area and the exit diameter may be used to calculate an exit cross-sectional area. An expansion ratio of the exit cross-sectional area divided by the throat cross-sectional area may be calculated. In an exemplary variation, the expansion ratio may be between about 200:1 and about 300:1. In some variations, the expansion ratio may be between about 100:1 and about 500:1, about 150:1 and about 450:1, about 150:1 and about 400:1, about 150:1 and about 350:1, or about 225:1 and about 275:1. The expansion ratio may be useful in determining an estimated thrust generated by expelling the propellant. In this way, each diameter value may be adjusted and/or used in adjusting, determining, and/or calculating the thrust generated by expelling propellant from the nozzle 120.

One or more parameters (e.g., pressure and temperature) of the spacecraft propulsion system may be measured by a sensor. For example, one or more sensors may be coupled to the heat exchanger 110. In an embodiment, the sensor port 170 of the heat exchanger 110 may be configured to receive a sensor 172. In some variations, the sensor port 170 may receive one or more of a pressure sensor, a temperature sensor, an accelerometer, or any other suitable sensor. For example, the sensor 172 may comprise a pressure transducer, a thermocouple, a thermistor, a resistance temperature detector, or any other suitable temperature sensor. The sensor 172 may be configured to measure at least one value associated with one or more features of the heat exchanger 110. For example, the sensor port 170 may be operatively coupled to the propellant channel 116 such that a sensor 172 received within the sensor port 170 may measure a pressure value of a propellant as the propellant flows through the propellant channel 116. In an embodiment, multiple sensor ports, each coupled to a sensor, may be operatively coupled at different locations along the same propellant channel 116. In this way, a pressure gradient may be determined from the pressure measurements gathered from each sensor in each sensor port 170. The pressure gradient may be useful in calculating an estimated thrust or used to adjust a propellant or pressurant flow rate. In further variations, the sensor port 170 may be operatively coupled to one or more of the propellant feed channel 114, plenum 118, and nozzle 120.

The heat exchanger body of the heat exchanger 110 may further define one or more fluid paths configured to receive a working fluid. The one or more fluid paths configured to receive a working fluid may include a working fluid inlet 162, a central cavity 164, a working fluid channel 166, and a working fluid outlet 168. The working fluid inlet 162 may be configured to receive the working fluid. In an embodiment, the working fluid inlet 162 may be fluidically connected to a working fluid line that is, in turn, fluidically connected to a working fluid tank 160. In some variations, there may be one or more working fluid valves (e.g., a working fluid pump) upstream of the working fluid inlet 162 and along the working fluid line. In this way, the working fluid valve may be configured to start (e.g., begin pumping), stop, or otherwise control flow of the working fluid through the working fluid inlet 162 autonomously or via a command sent by ground control personnel. The working fluid inlet 162 may be fluidically connected to the central cavity 164. The central cavity 164 may be configured to receive the working fluid. The central cavity 164 may be radially surrounded by the body of the heat exchanger 110. In this way, the central cavity 164 may be configured to efficiently receive heat from a working fluid flowing therethrough.

Heat transfer efficiency may be optimized by increasing a contact surface area between the working fluid and the walls of the central cavity 164. In an embodiment, the central cavity 164 can have a cylindrical shape. In some variations, the central cavity 164 may have a square shape, a rectangular shape, a spherical shape, or combination thereof. The shape of the central cavity 164 may be chosen to equally distribute the heat received from a working fluid. The central cavity 164 may be fluidically connected to a working fluid channel 166. In some variations, the heat exchanger body may comprise a plurality of working fluid channels. The working fluid channel 166 may extend radially outward from the central cavity 164 to an external surface of the heat exchanger body. In some variations, the working fluid channel 166 may form a spiral (e.g., helix) through the heat exchanger 110. The spiral defined by the working fluid channel 166 may be rotated around an axial dimension defined by the heat exchanger 110. In some variations, there may be a plurality of spirals defined by a plurality of working fluid channels 166.

The working fluid may be heated to a predetermined working fluid temperature (also referred to as an initial working fluid temperature). The working fluid may be heated within the working fluid tank 160 by a solar collector, nuclear reactor, radioisotope thermal generator, or any other suitable heat source. The predetermined working fluid temperature may be a bulk temperature of the working fluid before the working fluid enters the heat exchanger 110. In an exemplary variation, the predetermined working temperature may be about 2300 degrees C. In some variations, the predetermined working fluid temperature may be about 1000 degrees C., about 1100 degrees C., about 1200 degrees C., about 1300 degrees C., about 1400 degrees C., about 1500 degrees C., about 1600 degrees C., about 1700 degrees C., about 1800 degrees C., about 1900 degrees C., about 2000 degrees C., about 2100 degrees C., about 2200 degrees C., about 2400 degrees C., about 2600 degrees C., about 2700 degrees C., about 2800 degrees C., or greater.

In this way, the working fluid may flow into the working fluid inlet 162, through at least a portion of the central cavity 164, through the working fluid channel 166, and out of the working fluid outlet 168. The working fluid may transfer heat to any surface it contacts within the heat exchanger 110 as the working fluid flows therethrough. The amount of heat transferred by the working fluid may remain approximately constant along the flow path of the working fluid. In some variations, the amount of heat transferred by the working fluid may vary along the flow path of the working fluid. For example, a greater amount of heat may be transferred at a first location along the flow path than at a second location along the flow path. The first location may be closer to the working fluid inlet 162 than the second location. The amount of heat received by the heat exchanger 110 may determine the quantity and/or efficiency of heat transferred to a propellant flowing therethrough. For example, a greater amount of heat received by the heat exchanger may result in a greater overall temperature of the heat exchanger 110, which may result in relatively efficient heat transfer to the propellant and/or a higher propellant temperature. The transfer of heat from the working fluid to the heat exchanger may result in a decrease in the working fluid temperature. Accordingly, a working fluid outlet temperature at or near the working fluid outlet 168 may be about 1000 degrees C.

The working fluid may be reheated (e.g., to the predetermined working temperature) after flowing through the heat exchanger. The working fluid may be heated or reheated directly or indirectly via the solar collector, fission nuclear, radioisotope thermal generator, or heaters described herein. For example, the working fluid may be heated by a solar collector, configured to capture solar energy, after the working fluid has exited one or more working fluid channels. After being reheated, the working fluid may then recirculate, such as by the working fluid pump, through the working fluid channels 166 of the heat exchanger 110. The working fluid may be recirculated without significant degradation of the heat transfer characteristics of the working fluid. In some variations, the working fluid lines may fluidically connect the working fluid outlet 168 to the working fluid inlet 162. In this way, the working fluid may be directly recirculated through the heat exchanger 110 without returning the working fluid to the working fluid tank.

The one or more working fluid paths described herein may be configured to transfer heat to propellant in the propellant channels 116 and/or propellant feed channels 114 via sidewalls separating the fluid paths (e.g., material between the propellant channel and propellant feed channels, working fluid channel and propellant channel, and working fluid channel and propellant feed channel) within the heat exchanger 110. It may be desirable for the working fluid to be chemically stable at high temperatures, have a low vapor pressure, a relatively high heat capacity, a relatively high thermal conductivity, and/or relatively low viscosity. Molten salts, such as, for example, as nitrates, chlorides, and fluorides (alone or in a mixture) and molten metals, such as, for example, sodium, lead, or tin may be particularly well suited as working fluids. In an exemplary variation, the working fluid may be a molten salt comprising fluorine, lithium, and beryllium (e.g., FLiBe). The working fluid may advantageously melt from crystalline grains in a solid state to a liquid such that the working fluid has a viscosity sufficient to flow through one or more components of the spacecraft propulsion system. In an exemplary variation, the molten salt can have a mass of about 5 kg. In further variations, the molten salt may can have a mass of about 1 kg, about 3 kg, about 4 kg, about 6 kg, about 7 kg, about 8 kg, about 9 kg, about 10 kg, about 11 kg, about 12 kg, about 13 kg, about 14 kg, about 15 kg, about 20 kg, about 30 kg, about 40 kg, about 50 kg, or greater.

The heat exchanger described herein may comprise one more mounts configured to securely fasten the heat exchanger to the spacecraft. As shown in FIG. 1, a mount 180 may be configured to mount the heat exchanger 110 to one or more components of the spacecraft and/or spacecraft propulsion system 110. The mount 180 may be configured to receive a mechanical fastener such as, for example, a screw, a bolt, an adhesive, a strut, or any other suitable mechanical fastener. The mechanical fastener may be configured to engage with the mount 180 at a first end and a surface of the spacecraft at a second end. The mount 180 may comprise a plurality of mounts. The mount 180 may be located at any location along the external surface of the heat exchanger 110. In an embodiment, the mount 180 may be located at a proximal portion of the heat exchanger 110. In some variations, the mount 180 may be located at a distal portion of the heat exchanger 110. In some variations, the mount 180 may be located at a midpoint along an axial dimension of the heat exchanger 110. In some variations, there may be a plurality of mounts 180 that are located at one or more of the proximal portion of the heat exchanger 110, distal portion of the heat exchanger 110, and along an axial dimension of the heat exchanger 110.

Figure 2:
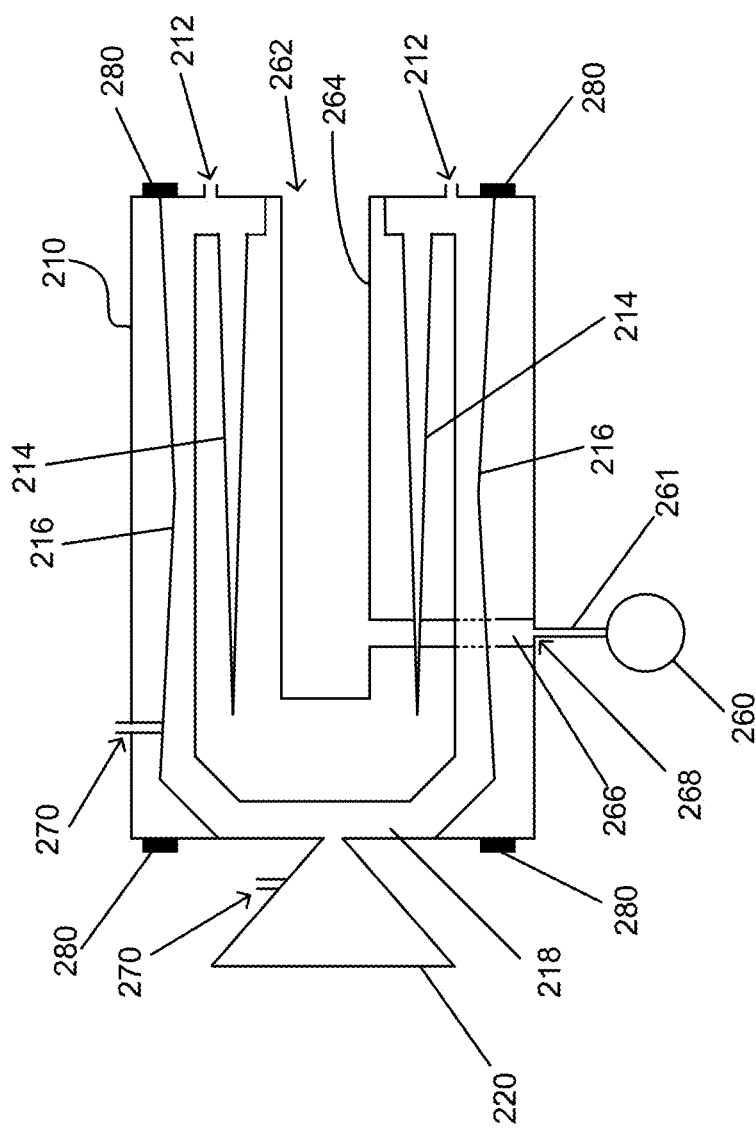
FIG. 2 is a schematic illustration of a heat exchanger of a spacecraft propulsion system, according to an embodiment.

FIG. 2 is a schematic illustration of a heat exchanger of a spacecraft propulsion system, according to an embodiment. The spacecraft propulsion system of FIG. 2 can be structurally and/or functionally similar to the spacecraft propulsion system shown in FIG. 1. The spacecraft propulsion system includes a heat exchanger 210, that can be structurally and/or functionally similar to the heat exchanger 110 shown and described above with reference to FIG. 2.

The heat exchanger 210 may comprise one or more fluid paths configured to receive a fluid, such as a propellant. As shown in FIG. 2, the heat exchanger 210 may comprise a propellant inlet 212. The propellant inlet 212 may comprise a plurality of propellant inlets. For example, the propellant inlet may comprise 2 propellent inlets, 3 propellent inlets, 4 propellent inlets, 5 propellent inlets, 6 propellent inlets, 7 propellent inlets, 8 propellent inlets, 9 propellent inlets, 10 propellent inlets, or more.

The propellant inlet 212 may be fluidically connected to a propellant feed channel 214. The propellant feed channel 214 may comprise a plurality of propellant feed channels. The propellant feed channel 214 may be configured to increase a time of contact between a fluid path sidewall of the heat exchanger 210 and a propellant flowing therethrough. The propellant feed channel 214 may extend along an axial dimension of the heat exchanger 210. The propellant feed channel 214 may include a closed end, such that a propellant may flow from the propellant inlet towards the closed end and subsequently back in the direction of the propellant inlet. In this way, the period of time during which the propellant is in contact with the walls of the heat exchanger 210 (via the walls of the propellant feed channel 214) is increased. In some variations, each of a plurality of propellant feed channels may be fluidically connected to at least one other propellant feed channel 214, a propellant channel 216, or a plenum 218. In further variations, the propellant feed channel 214 may decrease in cross sectional area in the flow direction, for example forming a triangular shape. The first width may be near or proximal to the propellant inlet 212. In this way, a pressure drop of propellant flowing through the propellant feed channel 214 may be reduced and/or heat transfer parameter associated with the heat transfer between the heat exchanger 210 and propellant flowing through the propellant feed channel 214 is increased relative to a propellant feed channel configuration where the width is kept constant along the entire length of the propellant feed channel. In addition or alternatively, the cross sectional area of the propellant feed channel 214 can be used to control the rate and location at which propellant flows from the (typically larger) propellant feed channels 214 into the (typically smaller) propellant channels 216, which may have a greater wetted surface area and therefore provide greater heat flux to the propellant.

The propellant inlet 212 may be fluidically connected to a propellant channel 216. In this way, the propellant inlet 212 may be fluidically connected to one or more of the propellant feed channel 214 (optionally present) and propellant channel 216. In some variations, the heat exchanger 210 may comprise a plurality of propellant channels. Each of the plurality of propellant channels 216 may be fluidically connected to a plenum 218. Each of the plurality of propellant channels 216 may extend along a radial dimension of the heat exchanger. In this way, each of the plurality of propellant channels 216 may be fluidically connected to every other propellant channel 216. As illustrated in FIG. 2, the width of the propellant channel 216 may vary along a length of the propellant channel 216. The propellant channel 216 can decrease in cross-sectional area such that one or more flow constriction points are formed. The constriction points may advantageously control the pressure of the propellant to decrease the pressure drop associated with the flow of propellant through the propellant channel 216. In some variations, the constriction points may result in a larger change in propellant temperature as the propellant flows through the propellant channel 216, which may be caused by increasing a ratio of propellant to surface area of the inner surface of the sidewalls of the propellant channels 216.

The exchanger 210 may further comprise a working fluid opening 262 fluidically connected to a central cavity 264. Each of the working fluid opening 262 and central cavity 264 may be configured to receive a working fluid. The central cavity 264 may fluidically connected to a working fluid channel 266. The working fluid channel 266 may be fluidically connected to a working fluid tank 260 via a working fluid outlet 268 and a working fluid line 261. The working fluid tank 260 may also be fluidically connected to the working fluid inlet 262. The working fluid pathways may be configured to transfer heat from the working fluid to the heat exchanger 210. In turn, the heat exchanger 210 may transfer heat to the propellant flowing through the propellant pathways.

The temperature of the propellant may increase as the propellant flows through the heat exchanger 210 to the plenum 218. The plenum 218 may be fluidically connected to the nozzle 220. The nozzle 220 may be configured to expel the propellant to generate thrust. Operatively coupled to the nozzle may be a sensor port 270. In some variations, there may be a plurality of sensor ports. For example, a first sensor port 270 may be operatively coupled to the nozzle 220 and a second sensor port 270 may be operatively coupled to the propellant channel 216.

The heat exchanger 210 may comprise a mount 280. In some variations, the heat exchanger may comprise a plurality of mounts. In an embodiment, a first mount 280 and a second mount 280 may each be coupled to a distal portion of the heat exchanger 210, and a third mount 280 and a fourth mount 280 may each be coupled to a proximal portion of the heat exchanger 210. The quantity and location of the mount 280 may be determined by one or more values associated with a rocket launch, fairing separation, spacecraft deployment, and spacecraft maneuver. For example, the one or more values may comprise a vibrational load, an acoustic load, and a shock load.

Figure 3B:
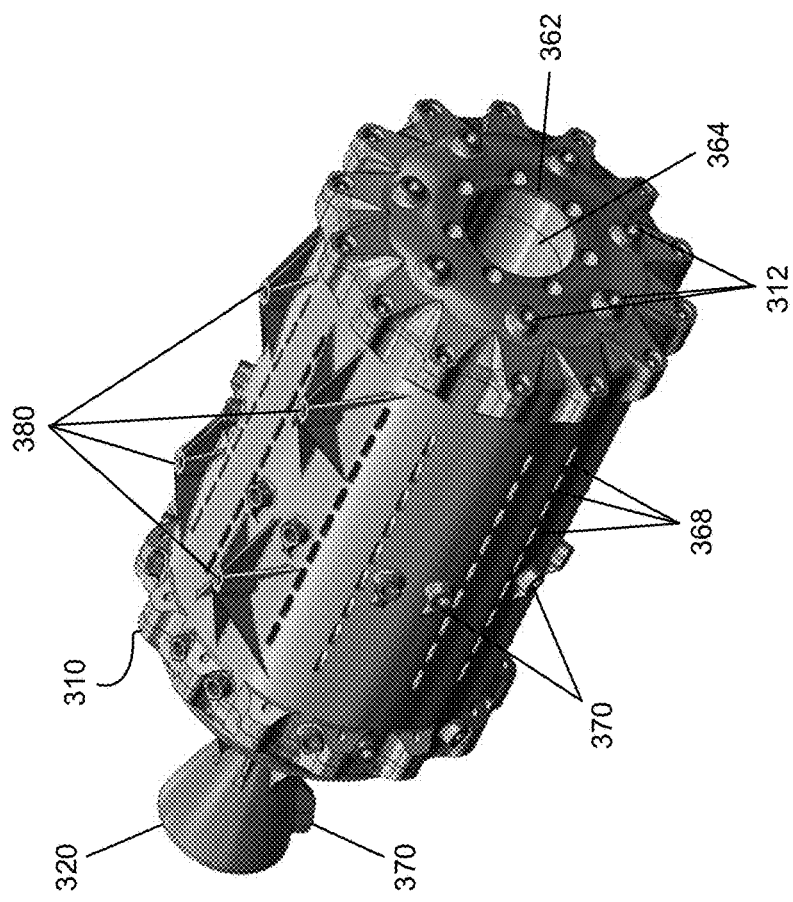
FIG. 3A and FIG. 3B are renderings of an illustrative variation of a spacecraft propulsion system, according to an embodiment.
Figure 3A:
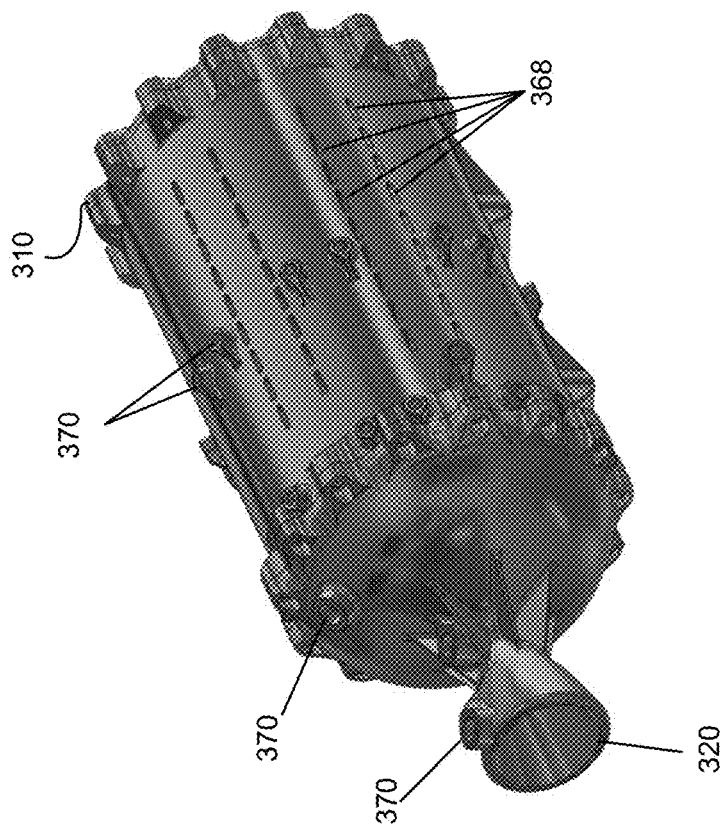

FIG. 3A and FIG. 3B are renderings of an illustrative variation of a spacecraft propulsion system, according to an embodiment. The heat exchanger 310 may be coupled to a nozzle 320 at a distal portion of the heat exchanger 310. The nozzle 320 may be configured to expel a propellant, after the propellant has flown through at least a portion of the heat exchanger 310. The propellant may be expelled, thereby generating thrust, without combusting. The heat exchanger 310 may include a sensor port 370. The sensor port 370 may comprise a plurality of sensor ports. A sensor received by the sensor port 370 may measure at least one parameter associated with a propellant flowing through the heat exchanger 310, plenum 318, and/or nozzle 320. For example, the sensor may measure a propellant pressure value and/or a propellant temperature value as the propellant flows through any one of the heat exchanger 310, plenum 318, and nozzle 320. The propellant pressure value and/or temperature value may be sent to a controller onboard the spacecraft and/or sent to a ground control station monitored by ground control personnel. The propellant pressure value and/or temperature value may determine the status of the propellant valve. For example, ground control personnel may send a command to the spacecraft to close a propellant valve in response to a propellant pressure value lower than a target pressure value. In another example, ground control personnel may send a command to the spacecraft to open a pressurant valve to release a volume of pressurant to the propellant tank in response to a propellant pressure value lower than a target pressure value. In a further example, ground control personnel may increase a working fluid flow rate through the heat exchanger in response to a propellant temperature value lower than a target propellant temperature value.

The heat exchanger 310 may further comprise a working fluid inlet 362 at a proximal portion of the heat exchanger 310. The working fluid inlet 362 may be configured to receive a working fluid. The working fluid inlet 362 can have a diameter at least partially determined by a target flow rate of a working fluid. In turn, the target flow rate of a working fluid rate may be at least partially determined by a target heat transfer rate between the working fluid and the heat exchanger 310. The central cavity 364 may be fluidically connected to the working fluid inlet 362. The central cavity 364 may be centered within the heat exchanger 310 and may extend along an axial dimension. In some variations, the central cavity 364 may not be centered. In some variations, the central cavity may comprise a plurality of central cavities, each configured to receive a working fluid and each fluidically connected to a separate working fluid inlet 362.

A working fluid channel (also referred to as a radial channel) and a working fluid outlet 368 can be fluidically coupled to the central cavity 364, such that the working fluid can pass from the central cavity 364, through the heat exchanger 310 via the working fluid channel, and exit via the working fluid outlet 368. The working fluid outlet 368 may be through an outer radial surface of a curved middle portion of the heat exchanger 310. The working fluid outlet 368 may comprise a plurality of working fluid outlets. For example, the working fluid outlets may comprise 1 outlet, 2 outlets, 3 outlets, 4 outlets, 5 outlets, 6 outlets, 7 outlets, 8 outlets, 9 outlets, 10 outlets, or more. In some variations, the plurality of working fluid outlets 368 may be spread equidistantly around the circumference of the heat exchanger 310. In further variations, the working fluid outlets may be distributed in any manner around the circumference of the heat exchanger 310.

The heat exchanger 310 may further comprise a plurality of mounts located along a curved central portion. As shown in FIG. 3B, a plurality of mounts 380 may be located at a plurality of positions along the curved central portion of the heat exchanger 310. The mounts 380 may be located such that the heat exchanger 310 may remain securely attached to a spacecraft when the spacecraft propulsion system applies thrust and/or the spacecraft otherwise experiences a structural load (e.g., acoustic vibration or shock event).

Figure 4A:
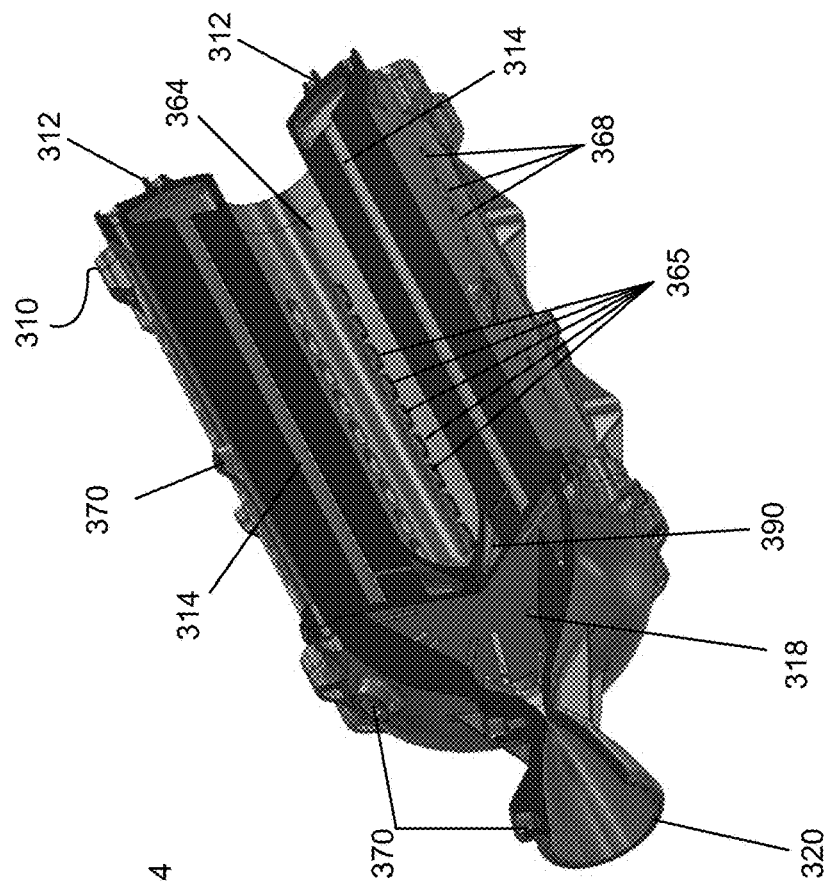
FIG. 4A and FIG. 4B are cross-sectional views of the spacecraft propulsion system of FIGS. 3A-3B.
Figure 4B:
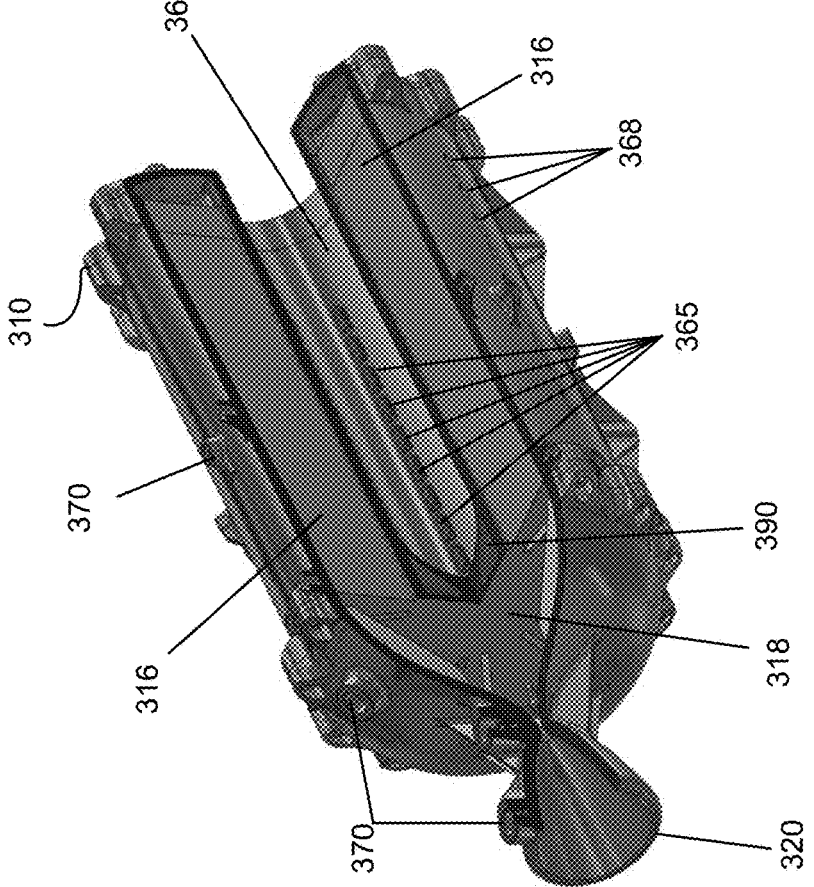

FIG. 4A and FIG. 4B are cross-sectional views of the spacecraft propulsion system of FIGS. 3A-3B. As shown, the heat exchanger 310 may comprise a propellant inlet 312. In some variations, the heat exchanger 310 may comprise two or more of propellant inlets. Each of the propellant inlets 312 may be fluidically connected to a propellant feed channel 314 and/or propellant channel 316. The propellant feed channel 314 may extend parallel to the central cavity 364. At a distal end of the propellant feed channel 314 may be a fluid reservoir 390. The fluid reservoir 390 may be directly fluidically coupled to the propellant feed channel 314 and configured to contain a bolus of relatively cold propellant to cool a portion of the heat exchanger 310 that is subject to particularly high heat flux. The corresponding section of the central cavity 364 may be referred to as a thermal stagnation point. The thermal stagnation point may be an area of the heat exchanger 310 subject to degradation if not cooled by, for example, sufficient propellant present in the fluid reservoir 390.

In some variations, a propellant channel 316 and a propellant feed channel 314 may be at least partially fluidically separated from one another by, for example, a wall of the heat exchanger 310. The propellant feed channel 314 may be configured to receive a propellant via the propellant inlet 312. The propellant feed channel 314 can have any suitable cross-sectional shape, such as a rectangle, a circle, a triangle, a square, a trapezoid, or combination thereof. In some instances, the shape of the cross-sectional area can change along the flow path to vary, for example, local rate of heat transfer or local pressure drop. Additive manufacturing techniques described in further detail herein, can be particularly well suited to forming propellant feed channels 314 having variable geometry. The propellant feed channel 314 may extend along an axial dimension of the heat exchanger 310. The propellant feed channel 314 may comprise a length and a width such that the propellant feed channel length may be greater than the propellant feed channel width. The propellant feed channel length and width may be used to calculate an aspect ratio. In an exemplary variation, the propellant feed channel aspect ratio may be between about 4:1 and about 6:1. In some variations, the propellant feed channel aspect ratio may be between about 2:1 and about 8:1, about 4:1 and about 10:1, about 4:1 and about 12:1, about 6:1 and about 8:1, about 6:1 and about 10:1, about 6:1 and about 12:1, about 8:1 and about 10:1, or about 8:1 and about 12:1. The length of the propellant feed channel 314 may be less than a length of the heat exchanger 310. In an exemplary variation, the heat exchanger can have a length of 20 inches. In other variations, the length of the heat exchanger can be 10 inches, 12 inches, 14 inches, 16 inches, 18 inches, 22 inches, or greater. In some variations, the propellant feed channel 314 extends along a plane parallel to an axial dimension of the heat exchanger.

The propellant channel 316 may be configured to receive a propellant. For example, the propellant channel 316 may have a cross-sectional shape such as a rectangle a circle, a triangle, a square, a trapezoid, or combination thereof. In some instances, the shape of the cross-sectional area can change along the flow path to vary, for example, local rate of heat transfer or local pressure drop. Additive manufacturing techniques described in further detail herein, can be particularly well suited to forming propellant channels 316 having variable geometry. The propellant channel 316 may extend along an axial dimension of the heat exchanger 310. In some variations, the propellant channel 116 may extend along a plane parallel to an axial dimension of the heat exchanger 310. The propellant channel 316 may comprise a length and a width such that the propellant channel length may be greater than the propellant feed channel width. The propellant channel length and width may be used to calculate an aspect ratio. In an exemplary variation, the propellant channel aspect ratio may be between about 4:1 and about 6:1. In some variations, the propellant channel aspect ratio may be between about 2:1 and about 12:1, about 4:1 and about 10:1, about 4:1 and about 8:1, or about 6:1 and about 8:1. One or more of the propellant channel length and width may be at least partially determined by the rate of heat transfer from working fluid to the propellant fluid the heat exchanger 310. In some variations, the propellant feed channel 314 extends at an angle relative to the axial dimension of the heat exchanger. In an embodiment, the propellant channel 316 (or any other fluid channel described herein) may form a spiral (e.g., helix) through the heat exchanger 310. The spiral defined by the propellant channel 316 may be by about an axial dimension defined by the heat exchanger 310. In some variations, there may be a plurality of spirals defined by a plurality of propellant channels 316. Each propellant channel 316 of the plurality of propellant channels may be fluidically connected to one or more propellant feed channels 314. In some variations, the propellant channel 316 may be in direct fluid communication with the propellant inlet 312.

The propellant channel 316 may be fluidically connected to a plenum 318. The plenum 318 may be configured to contain a volume of propellant. The plenum 318 may comprise one or more protrusions configured to direct flow of the propellant. For example, the plenum 318 may comprise a series of ribs configured to maximize propellant flow towards a throat of the nozzle 320. The ribs may each comprise a protrusion extending from a sidewall of the plenum 318. The series of ribs may be configured to reduce swirl of the propellant as the propellant flows therethrough. In this way, the ribs may encourage equal mass distribution of the propellant around the plenum 318. Additionally or alternatively, the ribs may provide structural support to the rest of the heat exchanger 310. The plenum 318 may be fluidically connected to the nozzle 320. In this way, the heat exchanger 310 may be configured to convey propellant from the propellant channel 316, through the plenum 318, and through the nozzle 320. The propellant may be expelled via the nozzle 320 without combusting.

In addition to the channels configured to receive a propellant described herein, the heat exchanger may further define channels configured to receive a working fluid, such as the central cavity 364. The central cavity 364 may be configured to contain (i.e., store) a working fluid for a limited time period such as, for example, about 30 seconds or less. The central cavity 364 may define a reservoir extending along an axial dimension of the heat exchanger 364. The central cavity 364 may comprise a length and a diameter. The central cavity length and/or diameter may be at least partially determined by a target flow rate of a working fluid flowing therethrough and/or a target rate of heat transfer from the working fluid. The central cavity 364 may be fluidically connected to at least one working fluid channel. The working fluid channel may extend radially from the central cavity 364 to the working fluid outlet 368. Each of the working fluid channel and/or central cavity 364 may be configured to receive heated working fluid flowing therethrough and such that a local and/or bulk temperature of the heat exchanger 310 and/or propellant is increased.

Figure 5B:
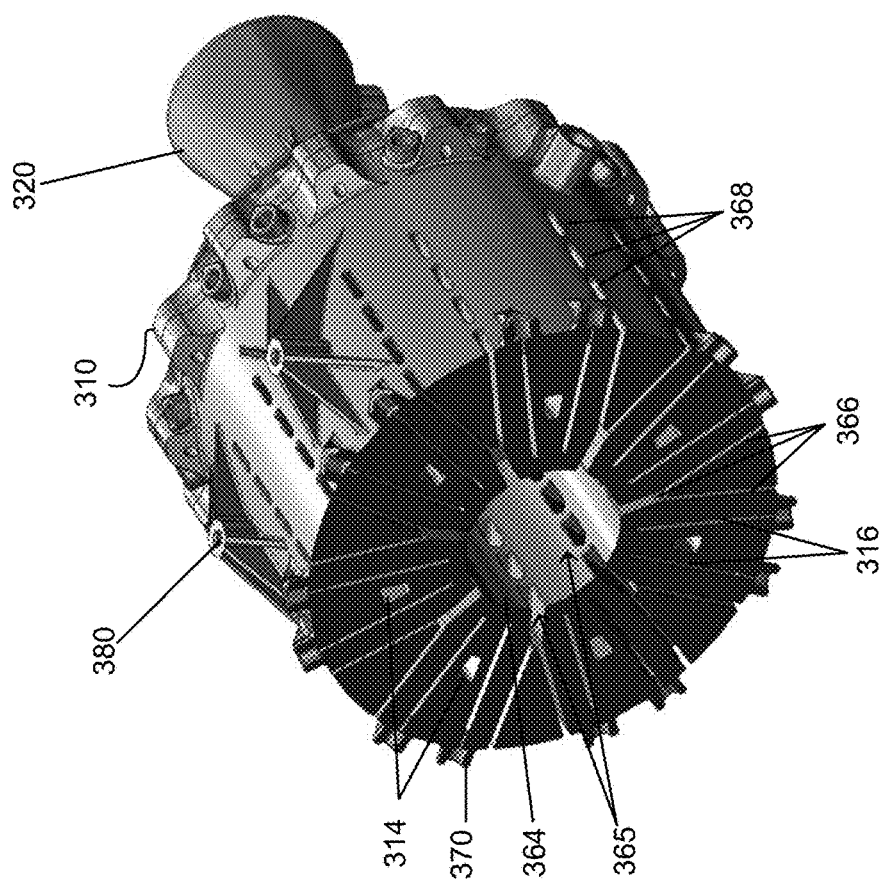
FIG. 5A and FIG. 5B are transverse cross-sectional views the heat exchanger of the spacecraft propulsion system of FIGS. 3A-3B.
Figure 5A:
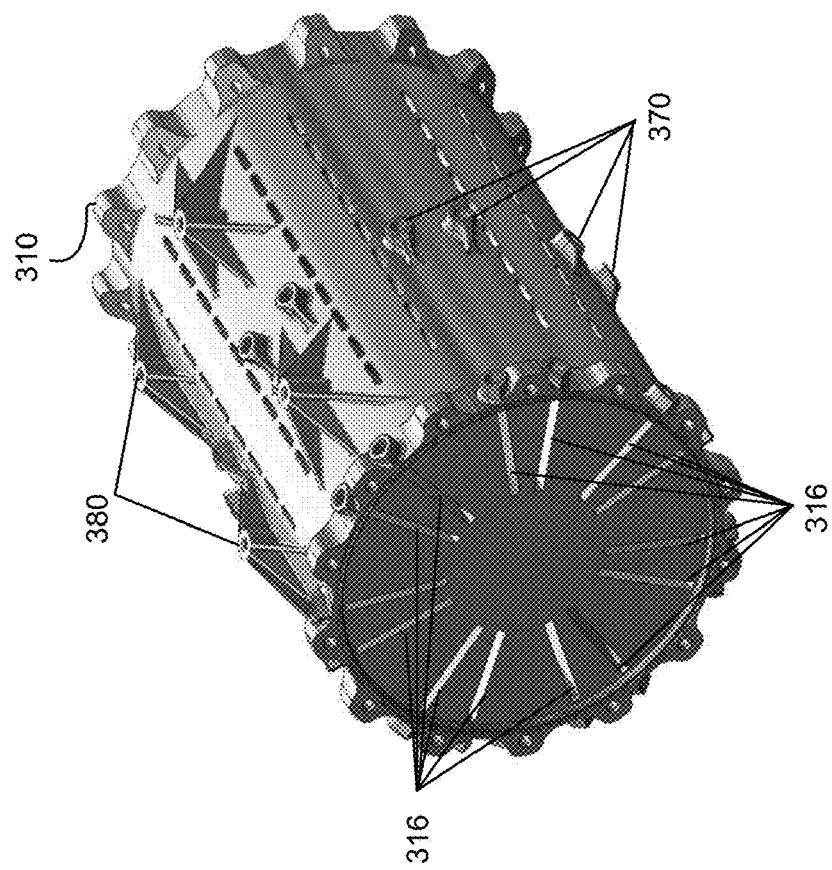

FIG. 5A and FIG. 5B are transverse cross-sectional views the heat exchanger of the spacecraft propulsion system of FIGS. 3A-3B. As described above in reference to FIGS. 4A and 4B, the heat exchanger 310 may comprise a plurality of propellant channels 316 and a plurality of propellant feed channels 314. At least one of the plurality of propellant channels 316 and/or plurality of propellant feed channels 314 may extend axially along the heat exchanger 310. The plurality of propellant channels 316 may be positioned throughout the heat exchanger body. In some variations, the propellant channels 316 are positioned equidistant relative to any other propellant channel 316. In further variations, the propellant channels 316 are separated by varying distances from any other propellant channel 316. Interposing the propellant channels 316 may be at least one of the plurality of propellant feed channels 314.

The heat exchanger body may define a central cavity 364. The central cavity 364 may be radially surrounded by the heat exchanger body. The central cavity 364 may be configured to receive a working fluid. Interposing a sidewall of the central cavity 364 may be one or more working fluid channel inlets 365. The working fluid channel inlets 365 may define an opening with a length and a width. The working fluid channel inlet length and working fluid channel inlet width may be determined based on a target working fluid flow rate. The target working fluid flow rate may be associated with a target change in propellant temperature, which in turn may correspond to a target thrust to be generated by expelling the propellant from the heat exchanger 310.

The working fluid channel inlets 365 may be configured to receive a working fluid from the central cavity 364. Each of the working fluid channel inlets 365 may be fluidically connected to one or more working fluid channels 366. The working fluid channels 366 may extend radially from the central cavity to an external surface of the heat exchanger 310. The working fluid channel 366 may comprise a length and a width. The working fluid channel length and working fluid channel width may be determined based on a target working fluid flow rate. In some variations, the working fluid channels may comprise a Y-shape, a V-shape, or a U-shape. The working fluid channel may extend radially from working fluid channel inlets 365 of the central cavity 364 to the working fluid outlet 368. The working fluid channels 366 may interpose the plurality of propellant channels 316. Each of the plurality of propellant channels 316 and propellant feed channels 314 may be fluidically separated from the working fluid channels. In this way, the working fluid channels 366 may be configured to receive heat from the working fluid flowing therethrough and transfer the heat to a propellant flowing through one or more of the propellant channels 316 and propellant feed channels 314.

In some variations, a propellant may be heated by alternative methods that do not utilize a heat exchanger and/or a working fluid. For example, a propellant tank may be fluidically coupled to a nuclear fission reactor and a nozzle. The nuclear fission reactor may comprise one or more propellant fluid paths configured to transfer heat to propellant flowing therethrough. In this way, a propellant temperature value may increase as propellant flows through the nuclear fission reactor such that a thrust may be generated (equivalent to the thrust described herein) after the propellant exits the nuclear fission reactor and upon being expelled via the nozzle. In further variations, the nuclear fission reactor may comprise one or more working fluid paths configured to transfer heat to the working fluid flowing therethrough. For example, one or more fuel rods of the nuclear fission reactor may be at least partially submerged in the working fluid such that heat is transferred from the fuel rods to the working fluid. This may advantageously increase the temperature of the working fluid while maintaining the fuel rods and fission reactor at or below a safe operating temperature (e.g., below a melting temperature of the nuclear fuel or related fuel rod components). After the working fluid has received heat from the fuel rods, the working fluid may be circulated (e.g., pumped) into and through the heat exchanger described herein. The nuclear fission reactor may utilize relatively low-enriched uranium, which may not be as efficient as other systems or methods described herein but may generate sufficient radiative heat to increase a propellant temperature to a value associated with an acceptable thrust level. In further variations, the working fluid described herein may

II. Methods of Manufacturing and Operating Spacecraft Propulsion Systems

The spacecraft propulsion system and devices described herein may be used to propel a spacecraft through a space environment. The spacecraft propulsion system may be configured to fire one or more thrusters fluidically connected to, or defined by, a heat exchanger (such as the heat exchanger described herein). One or more of a propellant, a pressurant, and a working fluid may be used by the heat exchanger to generate a thrust during the one or more thruster firings.

Figure 6B:
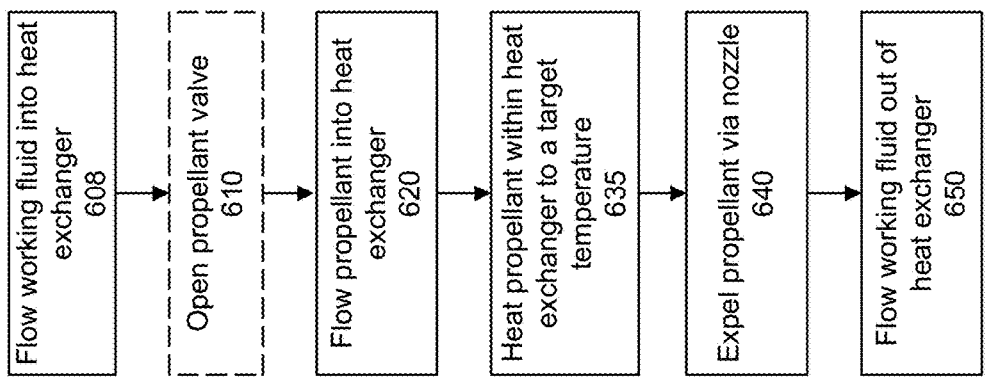
FIG. 6B is a flowchart of an illustrative variation of operating a spacecraft propulsion system.
Figure 6A:
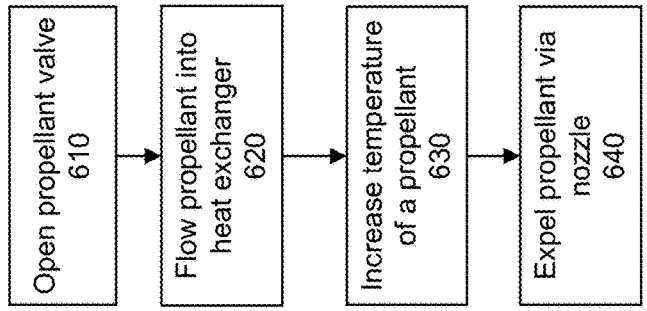
FIG. 6A is a flowchart of an illustrative variation of operating a spacecraft propulsion system.

FIGS. 6A and 6B are flowcharts of illustrative methods of operating a spacecraft propulsion system with a heat exchanger. In FIG. 6A, the method 601 may comprise opening a propellant valve in a step 610. For example, a propellant valve may be coupled to a propellant line that fluidically connects the heat exchanger to a propellant tank. The propellant valve may be configured to start, stop, modulate, or otherwise control flow of the propellant through the propellant line. Then, in a step 620, a propellant may flow from the propellant tank into the heat exchanger. For example, a propellant comprising ammonia may flow into the heat exchanger via a propellant inlet and through one or more of the propellant feed channel and propellant channel. The propellant may flow through the propellant channel and/or propellant feed channel to the plenum. Then, in a step 630, a temperature value of the propellant within the heat exchanger may be increased. For example, the propellant temperature value may be increased via heat transferred from the heat exchanger as the propellant flows therethrough. The heat exchanger may have initially received heat from one or more of a nuclear reactor, a radioisotope thermal generator, a solar collector, a combustion source, a (hot) working fluid, and a heater. In an exemplary variation, the temperature of the propellant may be adjusted based on the amount of heat transferred from the working fluid to the heat exchanger and subsequently transferred from the heat exchanger to the propellant. The amount of heat transferred from the working fluid to the heat exchanger may be a function of material, thermal, and geometric properties of the heat exchanger and material, thermal, and flow rates of the working fluid. The amount of heat transferred from the heat exchanger to the propellant may be a function of determined by one or more of material, thermal, and geometric properties the heat exchanger and material, thermal, and flow rates of the propellant. In another example, the propellant temperature may value may be increased via a heater coupled to the heat exchanger and/or propellant flow paths. The propellant temperature may be measured by one or more temperature sensors received within one or more sensor ports of the heat exchanger. Finally, propellant may be expelled via a nozzle in a step 640. For example, propellant may flow from the plenum and through the nozzle. The propellant may be expelled without being combusted and may generate a thrust.

In FIG. 6B, the method 602 may comprise increasing the temperature of a propellant via a working fluid. The method 602 may include flowing a working fluid into a heat exchanger in a step 608. For example, a working fluid may flow from a working fluid tank to a working fluid inlet of a heat exchanger. The working fluid may flow through the working fluid inlet to a central cavity. From the central cavity, the working fluid may flow through at least one of a plurality of working fluid channels. The working fluid may transfer heat to any surface of the heat exchanger as it flows therethrough. In a step 610, a propellant valve may be opened. For example, a propellant valve may be coupled to a propellant line that fluidically connects the heat exchanger to a propellant tank. The propellant valve may be configured to start, stop, modulate, or otherwise control flow of the propellant through the propellant line. Then, in a step 620, propellant may flow into the heat exchanger. For example, the propellant valve may be opened to allow propellant to flow from the propellant tank to the propellant inlet of the heat exchanger. The propellant may flow through the propellant inlet to one or more of the propellant channel and propellant feed channel. The propellant may be heated within the heat exchanger to equal or above a target temperature in a step 635. In an exemplary variation, the temperature of the propellant may be adjusted based on the amount of heat transferred from the working fluid to the heat exchanger and subsequently transferred from the heat exchanger to the propellant. The amount of heat transferred from the working fluid to the heat exchanger may be a function of flow rate of the working fluid, geometry of the heat exchanger, and thermal and/or material properties of the working fluid and heat exchanger. The amount of heat transferred from the heat exchanger to the propellant may be a function of a flow rate of the propellant, geometry of the heat exchanger, and thermal and/or material properties of the propellant and of the heat exchanger. In another example, the propellant temperature may value may be increased via a heater coupled to the heat exchanger and/or propellant flow paths. The propellant temperature may be measured by one or more temperature sensors received within one or more sensor ports of the heat exchanger. The measured propellant temperature may be compared against the target temperature. If the measured propellant temperature is lower than the predetermined target temperature, one or more characteristics of the system may be adjusted. For example, in the variation using a working fluid is used, the propellant flow rate may be decreased and/or the working fluid flow rate may be increased. The propellant may then be expelled via a nozzle of the heat exchanger in a step 640. For example, propellant may flow from the plenum and through the nozzle. The propellant may be expelled without being combusted and may generate a thrust. Then, in a step 650, the working fluid may flow out of the heat exchanger. For example, the working fluid may flow through the working fluid channel and exit the heat exchanger via the working fluid outlet. In some variations, the working fluid outlet may be fluidically connected to a working fluid tank such that the working fluid may flow from the heat exchanger to the working fluid tank. Once the working fluid is contained within the working fluid tank, the temperature of the working fluid may then be increased by a heat generator such that the working fluid may be recirculated through the heat exchanger for subsequent firings of the spacecraft propulsion system.

The heat exchanger and/or any other component of the spacecraft propulsion system described herein may be manufactured by any suitable method. In an exemplary variation, the heat exchanger may be manufactured via an additive manufacturing process. The additive manufacturing process may comprise one or more of direct metal laser sintering (DMLS), selective laser melting (SLM), direct metal laser melting (DMLM), laser powder bed fusion (LPBF), laser metal deposition, binder jetting, and metal-fused filament fabrication. The additive manufacturing process may utilize a refractory metal such as copper, copper alloys, and/or niobium alloys (e.g., C-103). The material may be selected based on its high heat transfer characteristics, resistance to corrosion under high heat or pressure, resistance to relatively high heat, ease of manufacturing, or combination thereof. The material used in the additive manufacturing may comprise a powder, a solid, a liquid, or a mixture thereof. The additive manufacturing process may be used to create a monolithic structure that includes a nozzle, a plenum, and a heat exchanger body. In some variations, the additive manufacturing process may be used to create each component separately, and the separate components are coupled (i.e., assembled) in a separate manufacturing process. The separate manufacturing process used for assembly may include soldering, welding, melting, or otherwise securely adhering the components together.

As described above, the heat exchanger may be manufactured via an additive manufacturing process, which may advantageously form fluid channels (e.g., propellant feed channel, propellant channel, radial channel, or any other channel or cavity described herein) with non-uniform cross-sectional areas or other complex geometries that may not be possible via non-additive manufacturing processes. Accordingly, FIGS. 7A and 7B are flowcharts of illustrative methods of manufacturing a heat exchanger of a spacecraft propulsion system using additive manufacturing processes. In FIG. 7A, the method 701 may comprise depositing a first transverse layer of a refractory metal in a step 710. The first transverse layer may define a central cavity configured to contain a working fluid. The first transverse layer may also define a portion of a radial channel coupled to the central cavity that is configured to route the working fluid from the central cavity to an outlet port on an exterior radial surface of the heat exchanger. In some variations, the first transverse layer may also define a portion of a propellant feed channel. Then, a second transverse layer of a refractory metal may be deposited in a step 720. The second transverse layer may be deposited on top of at least a portion of the first transverse layer. The second transverse layer may be above the first transverse layer in an axial direction. The second transverse layer may define a portion of a propellant feed channel that is configured to convey a propellant axially through the heat exchanger such that heat is transferred from the working fluid to the propellant via the refractory metal. In some variations, the radial channel is a first radial channel configured to route the working fluid to a first outlet port, and the second transverse layer may define a portion of the central cavity and a portion of a second radial channel coupled to the central cavity that is configured to route the working fluid form the central cavity to a second outlet port. In some variations, the propellant feed channel is from a plurality of propellant feed channels partially defined by the second transverse layer. Each propellant feed channel from the plurality of propellant feed channels may be configured to convey the propellant axially through the heat exchanger. Then, in a step 730, a third transverse layer may be deposited above the second transverse layer. The third transverse layer may be deposited in an axial dimension. The third transverse layer may define an outlet to the propellant feed channel. Finally, a fourth transverse layer may be deposited above the third transverse layer in the axial dimension in a step 740. The fourth transverse layer may define a portion of a plenum coupled to the outlet of the propellant feed channel. The plenum may be configured to be convey propellant to a nozzle such that the propellant, after being heated by a working fluid via the refractory metal, may be expelled through the nozzle to produce thrust, without the propellant being combusted.

In FIG. 7B, the method 702 may comprise depositing a second transverse layer of a refractory metal in a step 750. The second transverse layer may define a portion of a propellant feed channel that is configured to convey a propellant axially through the heat exchanger such that heat is transferred from the working fluid to the propellant via the refractory metal. Then, a first transverse layer of a refractory metal may be deposited in a step 760. The first transverse layer may be deposited on top of at least a portion of the second transverse layer. The first transverse layer may be above the second transverse layer in an axial direction. The first transverse layer may define a central cavity configured to contain a working fluid. The first transverse layer may also define a portion of a radial channel coupled to the central cavity that is configured to route the working fluid from the central cavity to an outlet port on an exterior radial surface of the heat exchanger. In some variations, the first transverse layer may also define a portion of a propellant feed channel. In some variations, the radial channel is a first radial channel configured to route the working fluid to a first outlet port, and the second transverse layer may define a portion of the central cavity and a portion of a second radial channel coupled to the central cavity that is configured to route the working fluid form the central cavity to a second outlet port. Then, in a step 770, a third transverse layer may be deposited above the second transverse layer. The third transverse layer may be deposited in an axial dimension. The third transverse layer may define a portion of a plenum coupled to the outlet of the propellant feed channel. Finally, a fourth transverse layer may be deposited above the third transverse layer in the axial dimension in a step 780. The fourth transverse layer may define a portion of a nozzle configured to expel the propellant. The nozzle may be coupled to the plenum. The plenum may be configured to be convey propellant to a nozzle such that the propellant, after being heated by a working fluid via the refractory metal, may be expelled through the nozzle to produce thrust, without the propellant being combusted.

While embodiments of the present invention have been shown and described herein, those skilled in the art will understand that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

Throughout this application, the term "about" is used to indicate that a value includes the inherent variation of error for the device or the method being employed to determine the value, or the variation that exists among the samples being measured. Unless otherwise stated or otherwise evident from the context, the term "about" means within 10% above or below the reported numerical value (except where such number would exceed 100% of a possible value or go below 0%). When used in conjunction with a range or series of values, the term "about" applies to the endpoints of the range or each of the values enumerated in the series, unless otherwise indicated. As used in this application, the terms "about" and "approximately" are used as equivalents.

Where methods described above indicate certain events occurring in certain order, the ordering of certain events may be modified. Additionally, certain of the events may be performed concurrently in a parallel process when possible, as well as performed sequentially as described above. Although various embodiments have been described as having particular features and/or combinations of components, other embodiments are possible having a combination of any features and/or components from any of the embodiments where appropriate. For example, certain methods described above discuss an additive manufacturing process in which one layer is added above another layer. It should be understood that such steps could be reversed such that upper layers are deposited first, for example, by inverting the heat exchanger. Similarly stated, such a heat exchanger can be additively manufactured from the bottom up or the top down.

Some embodiments described herein relate to methods and/or processing events. For example, some methods described herein relate to the control of propellant and/or working fluid through a heat exchanger. It should be understood that such methods and/or processing events can be computer-implemented. That is, where method or other events are described herein, it should be understood that they may be carried out by a compute device, such as a controller having a processor and a memory. Similarly stated, instructions for carrying out such methods can be stored on a non-transitory processor readable medium as processor-readable code, such that, when executed, the instructions cause the processor to cause the various method steps to be performed, for example, by sending electrical signals to various actuators, valves, controllers, or other suitable devices.

What is claimed is:

1. A heat exchanger for a spacecraft propulsion system constructed via an additive manufacturing process, comprising: depositing a first transverse layer of a refractory metal, the refractory metal of the first transverse layer forming a proximal most surface of the heat exchanger, the refractory metal of the first transverse layer defining an axial inlet to a cavity configured to contain a working fluid; the refractory metal of the first transverse layer defining a propellant inlet to a propellant feed channel configured to convey a propellant axially through the heat exchanger; depositing a second transverse layer of the refractory metal distal to the first transverse layer, the refractory metal of the second transverse layer radially surrounding the cavity configured to contain the working fluid, the refractory metal of the second transverse layer forming portions of walls that define a radial channel, the walls of the radial channel forming an inlet on the wall of the cavity configured to contain the working fluid, the radial channel configured to route the working fluid radially away from the cavity configured to contain the working fluid; depositing a third transverse layer of the refractory metal distal to the first transverse layer, the refractory metal of the third transverse layer forming portions of an outlet port of the radial channel on an exterior radial surface of the heat exchanger; depositing a fourth transverse layer of the refractory metal distal to the first transverse layer, the refractory metal of the fourth transverse layer defining a portion of the propellant feed channel that is configured to convey the propellant axially through the heat exchanger such that heat is transferred from the working fluid to the propellant via the refractory metal; and depositing a fifth transverse layer of the refractory metal distal to the first transverse, the refractory metal of fifth transverse layer forming a portion of a wall of a plenum coupled to an outlet of the propellant feed channel; and depositing a sixth transverse layer of the refractory metal above the fifth transverse layer in the axial direction, the refractory metal of the sixth transverse layer forming a portion of a wall of a nozzle configured to expel the propellant, the nozzle coupled to the plenum, the nozzle having a shape configured to generate a predetermined amount of thrust.

2. The heat exchanger of claim 1, wherein the radial channel is from a plurality of radial channels, each radial channel from the plurality of radial channels having an inlet on the wall of the cavity configured to contain the working fluid, each radial channel from the plurality of radial channels further configured to route the working fluid radially from the cavity configured to contain the working fluid to an outlet port from a plurality of outlet ports that is on a radial surface of the heat exchanger.

3. The heat exchanger of claim 1, wherein the second transverse layer is deposited before the first transverse layer.

4. A heat exchanger for a spacecraft propulsion system constructed via an additive manufacturing process, comprising: depositing a first transverse layer of a refractory metal, the refractory metal of the first transverse layer radially surrounding and forming a portion of a wall of a central cavity, including a working fluid opening at a proximal end thereof in a proximal most surface of the heat exchanger, that occupies a central axis of the first transverse layer and is configured to contact and contain a working fluid, the refractory metal of the first transverse layer forming portions of walls that define a radial channel, the walls of the radial channel forming an inlet on the wall of the central cavity and an outlet on an exterior radial surface of the heat exchanger, the radial channel configured to contact and contain the working fluid as it flows from the central cavity, the radial channel configured to route the working fluid radially away from the central cavity to the outlet port; the refractory metal of the first transverse layer defining a portion of a propellant feed channel, including a propellant inlet to the propellant feed channel at a proximal end thereof in the proximal most surface of the heat exchanger, the propellant feed channel configured to convey a propellant axially through the heat exchanger such that heat is transferred from the working fluid to the propellant via the refractory metal; depositing a second transverse layer of the refractory metal above the first transverse layer in an axial direction, the refractory metal of the second transverse layer defining a further portion of the propellant feed channel; and depositing a third transverse layer of the refractory metal above the second transverse layer in the axial direction, the refractory metal of third transverse layer forming a portion of a wall of a plenum coupled to an outlet of the propellant feed channel; and depositing a fourth transverse layer of the refractory metal above the third transverse layer in the axial direction, the refractory metal of the fourth transverse layer forming a portion of a wall of a nozzle configured to expel the propellant, the nozzle coupled to the plenum, the nozzle having a shape configured to generate a predetermined amount of thrust.

5. The heat exchanger of claim 4, wherein:
the radial channel is a first radial channel configured to route the working fluid to a first outlet port; and
the refractory metal of the second transverse layer forms a portion of the wall of the central cavity and a portion of walls that define a second radial channel that is coupled to the central cavity and that is configured to route the working fluid from the central cavity to a second outlet port.

6. The heat exchanger of claim 4, wherein the first transverse layer is deposited before the second transverse layer.

7. The heat exchanger of claim 4, wherein the second transverse layer is deposited before the first transverse layer.

8. The heat exchanger of claim 4, wherein the radial channel is from a plurality of radial channels, each radial channel from the plurality of radial channels having an inlet on the wall of the central cavity and configured to route the working fluid from the central cavity to an outlet port from a plurality of outlet ports.

9. The heat exchanger of claim 4, wherein the propellant feed channel is from a plurality of propellant feed channels partially defined by the refractory metal of the second transverse layer, each propellant feed channel from the plurality of propellant feed channels configured to convey the propellant axially through the heat exchanger towards at least one outlet.

10. The heat exchanger of claim 4, wherein the propellant feed channel is from a plurality of propellant feed channels partially defined by the refractory metal of second transverse layer, each propellant feed channel from the plurality of propellant feed channels configured to convey the propellant axially through the heat exchanger to the nozzle such that propellant, after being heated by the working fluid via the refractory metal, is expelled through the nozzle to produce thrust.

11. The heat exchanger of claim 4, wherein the propellant feed channel is from a plurality of propellant feed channels partially defined by the refractory metal of the second transverse layer, each propellant feed channel from the plurality of propellant feed channels configured to convey the propellant axially through the heat exchanger to the nozzle such that propellant, after being heated by the working fluid via the refractory metal, is expelled through the nozzle to produce thrust, without the propellent being combusted.

12. The heat exchanger of claim 4, wherein the refractory metal is a niobium alloy.

13. The heat exchanger of claim 4, wherein the refractory metal is copper.

14. The heat exchanger of claim 4, wherein the refractory metal of the first transverse layer defines a portion of the propellant feed channel that is narrower than the portion of the propellant feed channel defined by the refractory metal of the second transverse layer.

15. The heat exchanger of claim 4, wherein the refractory metal of the first transverse layer defines a portion of the propellant feed channel that is narrower than the portion of the propellant feed channel defined by the refractory metal of the second transverse layer, the additive manufacturing process further comprising:
depositing a third transverse layer of the refractory metal above the second transverse layer in the axial direction, the refractory metal of the third transverse layer defining a portion of the propellant feed channel that is wider than the portion of the propellant feed channel defined by the refractory metal of the second transverse layer.

16. The heat exchanger of claim 4 constructed via the additive manufacturing process, further comprising:
depositing a third transverse layer of refractory metal, the third transverse layer of refractory metal forming a proximal most surface of the heat exchanger, the refractory metal of the third transverse layer defining an axial inlet to the central cavity.

* * * * *